US012625047B2

(12) United States Patent (10) Patent No.: US 12,625,047 B2
Sachdev et al. (45) Date of Patent: May 12, 2026

(54) PORTABLE POLYMER TESTER AND TESTING METHOD

(71) Applicant: CANDU ENERGY INC., Mississauga (CA)

(72) Inventors: Narendra Singh Sachdev, Oakville (CA); Jason Deadman, Georgetown (CA); Robert Jamieson, Toronto (CA); Panayotis Dritsas, Brampton (CA); Mark Adam Chudak, Oakville (CA); Cesar Antonio Bravo, Guelph (CA); Kevin Di Carlo, Cambridge (CA); Daniel Dat Ho, Kleinburg (CA); Susan Creber, Gravenhurst (CA)

(73) Assignee: CANDU ENERGY INC., Mississauga (CA)

( * ) Notice: Subject to any disclaimer, the term of this patent is extended or adjusted under 35 U.S.C. 154(b) by 1139 days.

(21) Appl. No.: 17/631,724

(22) PCT Filed: Jun. 10, 2020

(86) PCT No.: PCT/CA2020/050792
§ 371 (c)(1),
(2) Date: Jan. 31, 2022

(87) PCT Pub. No.: WO2021/022357
PCT Pub. Date: Feb. 11, 2021

(65) Prior Publication Data
US 2022/0283065 A1 Sep. 8, 2022

Related U.S. Application Data

(60) Provisional application No. 62/882,469, filed on Aug. 2, 2019.

(51) Int. Cl.
*G01N 3/42* (2006.01)
*G01N 3/54* (2006.01)

(52) U.S. Cl.
CPC ................. *G01N 3/42* (2013.01); *G01N 3/54* (2013.01); *G01N 2203/0094* (2013.01); *G01N 2203/0226* (2013.01); *G01N 2203/04* (2013.01)

(58) Field of Classification Search
CPC .... G01N 3/42; G01N 3/54; G01N 2203/0094; G01N 2203/0226; G01N 2203/04; G01N 2203/0208; G01N 3/04
(Continued)

(56) References Cited

U.S. PATENT DOCUMENTS 4,435,976 A * 3/1984 Edward, Jr. .............. G01N 3/44
73/83
4,635,471 A * 1/1987 Rogers ..................... G01N 3/42
73/78

(Continued)

FOREIGN PATENT DOCUMENTS

CN 101984333 A 3/2011
CN 102975047 A 3/2013
(Continued)

OTHER PUBLICATIONS

An extended European Seach Report issued in the corresponding European Patent Application No. 20849426.0, dated Jun. 29, 2023, issued by the European Patent Office.
(Continued)

*Primary Examiner* — Marrit Eyassu
(74) *Attorney, Agent, or Firm* — NORTON ROSE FULBRIGHT CANADA LLP

(57) ABSTRACT

A portable testing device and method for measuring physical characteristics of a polymeric or elastomeric material is provided. The testing device includes an indenter probe; a drive system for controlling movement of said probe, said drive system comprising a motorized linear slide operatively
(Continued)

associated with the probe to advance said probe from a first position to a second position to deform said polymeric or elastomeric material and to facilitate instant or fast retraction of said probe to a predetermined intermediate position between said first and second positions; and a force/displacement measurement system including a first sensor for measuring force at the tip of said probe during contact with said polymeric or elastomeric material and a second sensor for measuring displacement of the probe; and a controller configured to provide control to the force/displacement measurement system and the drive system.

16 Claims, 24 Drawing Sheets

(58) Field of Classification Search
USPC .......................................................... 73/78–85
See application file for complete search history.

(56) References Cited

U.S. PATENT DOCUMENTS

| | | | | |
|---|---|---|---|---|
| 6,301,970 | B1 * | 10/2001 | Biggs ...................... | G06F 30/23 |
| | | | | 73/789 |
| 6,332,364 | B1 * | 12/2001 | Buschmann ............. | G01N 3/20 |
| | | | | 73/788 |
| 8,857,246 | B2 * | 10/2014 | Guerout ................... | G01N 3/42 |
| | | | | 73/82 |
| 10,107,732 | B2 * | 10/2018 | Guerout ................... | G01N 3/42 |
| 2012/0085155 | A1 * | 4/2012 | Guerout ................... | G01N 3/42 |
| | | | | 73/82 |
| 2012/0118071 | A1 | 5/2012 | Doble et al. | |
| 2015/0090016 | A1 | 4/2015 | Guerout et al. | |
| 2016/0334315 | A1 | 11/2016 | Leroux et al. | |

FOREIGN PATENT DOCUMENTS

| | | | | |
|---|---|---|---|---|
| CN | 204405516 | | 6/2015 | |
| CN | 108225937 | A | 6/2018 | |
| CN | 108572134 | A * | 9/2018 | ............. G01N 17/00 |
| CN | 110031552 | A | 7/2019 | |
| DE | 102015008326 | A1 * | 1/2017 | .............. G01N 3/42 |
| KR | 2011009187 | A | 8/2011 | |

OTHER PUBLICATIONS

Material Testing Research and Indenter Equipment Modifications for Determining Aging of Wires (Cables) in Aircraft, Internet Citation, Oct. 1, 2004 (Oct. 1, 2004), pp. 1-1, XP008148277.

Catherine A. Tweedie et al: "On the indentation recovery and fleeting hardness of polymers", Journal of Materials Research, vol. 21, No. 12, Dec. 1, 2006 (Dec. 1, 2006), pp. 3029-3036, XP055181537.

An office action issued in the corresponding Canadian Patent Application No. 3,149,318, dated Jun. 27, 2023, issued by the Canadian Patent Office.

International Search Report and Written Opinion issued in the corresponding International (PCT) Patent Application No. PCT/CA2020/050792 on Sep. 8, 2020.

European Patent Office, Examination Report in EP Application No. EP 20,849,426 dated Mar. 19, 2024.

An Office Action issued in the corresponding CA 3,149,318, dated Jan. 11, 2024.

Laser Heater for Nanoindentation, © 1988-2019 Surface systems + technology GmbH & Co. KG.

High Temperature Indentation Testing, © 2015 by MechAction, Inc.

Innovation, Science and Economic Development (CIPO) Office Action, issued on Application No. 3,149,318, dated May 2, 2025.

Chinese Patent Office, Office Action, issued on Application No. 202080068260.6, dated May 27, 2025.

Korean Patent Office, Office Action, issued on Application No. 10-20227006396, dated Aug. 20, 2025.

* cited by examiner

FIG. 4C

× Stiffness (N/mm)
• Average Stiffness (N/mm)

× Time to Recover 35% of Initial Elastomer Deformation (s)

• Average Recovery Time (s)

FIG. 15A
FIG. 15B
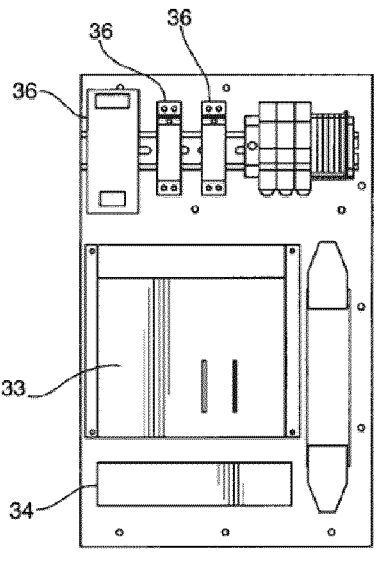
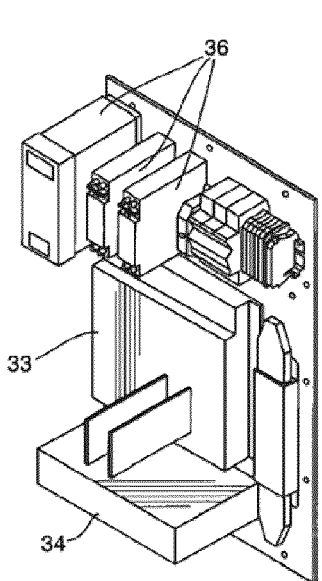

FIG. 16A
FIG. 16B
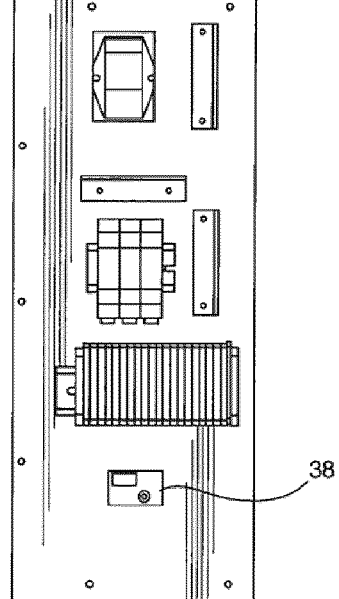
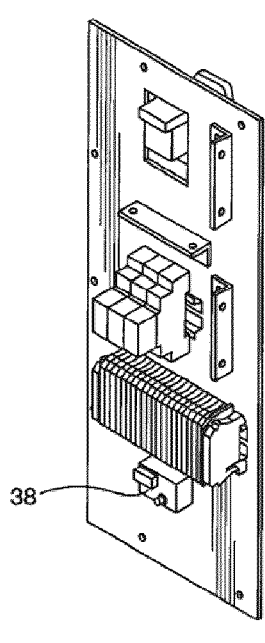

FIG. 17A                    FIG. 17B
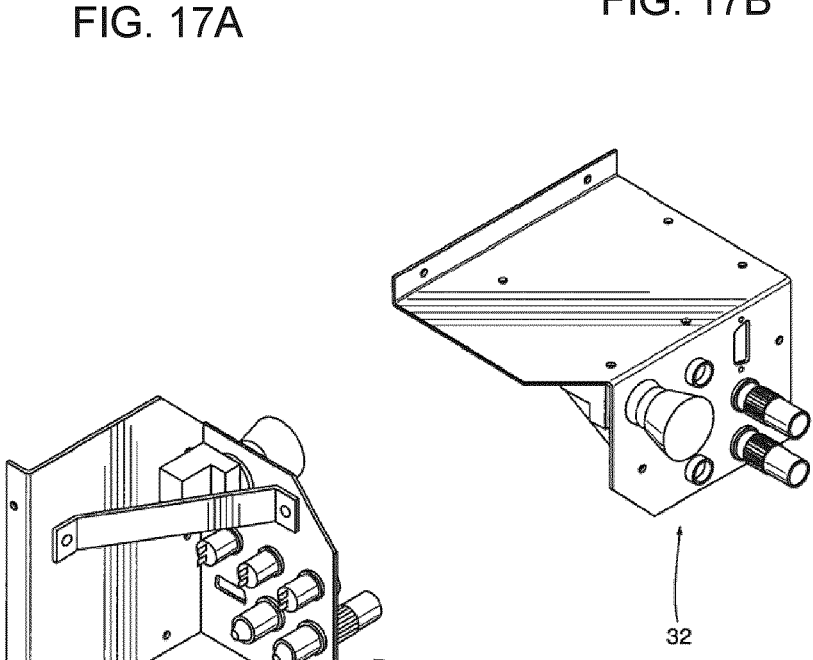

PORTABLE POLYMER TESTER AND TESTING METHOD

CROSS-REFERENCE TO RELATED APPLICATION

This application claims all benefit including priority to U.S. Patent Application No. 62/882,469, filed Aug. 2, 2019, and entitled, "PORTABLE POLYMER TESTER AND TESTING METHOD", the entirety of which is hereby incorporated by reference.

FIELD

The present disclosure pertains to the field of polymer material testing and, more particularly to the field of portable polymer testers for in-situ monitoring of polymer-based components.

BACKGROUND

The aging of polymers is of considerable importance to, among others, aerospace, oil & gas, industrial, electrical power plant operators, or any industry where unplanned failures can risk public safety or have severe financial consequences, in that the unanticipated failure of such polymers may have significant adverse effects on human safety, plant operation and maintenance costs and downtime. Polymers are used in key components related to the safe and reliable operation of industrial and power plants. Specifically, polymers are found in, but not limited to; cables, pumps, valves and seals.

Electrical and optical cables, such as power, control, instrumentation and data transmission have traditionally been considered long-lived components which merit little in the way of preventive maintenance or condition monitoring due to their generally high level of reliability and simplicity of construction. Like all other components, however, such cables age as a result of operational and environmental stressors. The typical modes of degradation due to cable aging are embrittlement leading to cracks, loss of dielectric strength, and increased leakage current. The main stressors causing age-related degradation are thermal aging resulting from elevated temperatures, ionising radiation, and neutron radiation. Other degradation stressors of cables include mechanical stresses, humidity, hydrocarbon fluids, and ozone.

SUMMARY

Based on the foregoing, there remains a need for a method and device for monitoring and estimating the aging of polymer cable, which method and device is portable, non-destructive and permits optimization and measurement of characteristics other than merely polymer stiffness.

The present disclosure describes a portable polymer tester. In accordance with one aspect, there is provided a method and device for indenting polymer material, such as cable insulation or cable jacket material, to generate indentation and post-indentation parameters that characterize the visco-elastic properties of the polymer material tested. The visco-elastic properties are used as an indicator of polymer age and degradation. The method and device of the present disclosure measures stiffness (measurement of force and displacement) of polymeric material, as well as the time taken by the polymeric material to recover a set portion of the initial deformation. This duration can be used as an indicator of polymer material degradation.

In accordance with another aspect, there is provided a polymer tester for measuring physical characteristics of a polymer material, such as a polymer jacket of a cable, said polymer tester comprising: jaw assemblies for retaining a sample, such as a cable or a flat elastomeric sample, during testing; an interchangeable and moveable probe; a drive system for advancing the probe to contact and deform the polymer jacket of the cable, said drive system comprising a motor and a linear slide; and a force/displacement measurement system including a mechanism for measuring force at the tip of said probe during contact with said polymer jacket and means for measuring displacement of the probe.

In an embodiment, the testing device may comprise a heater configured to heat a test location of the polymeric or elastomeric material to a set temperature.

In another embodiment, the testing device may comprise a linear encoder located on a non-deflecting part of the drive system. In an embodiment, the linear encode is located proximate to the tip of the indenter probe for measuring the indenter probe position.

In another embodiment, the motorized linear slide of the testing device is a direct current servo drive and ball screw drive.

In anther embodiment, the motorized linear slide of the testing device is piezo-electric motor and a ball screw drive or linear actuator.

In another embodiment, the testing device may comprise a sample retaining assembly including a clamp for immobilizing all or a portion of the material during testing, and a clamp control module configured to receive clamp force data from a load cell indicating the force between the clamp and material, and to move the clamp to maintain a set force.

In another embodiment, the polymer tester may comprise a controller comprising an control software program for providing control to the force/displacement measurement system and the drive system. The controller may be configured to be loaded in advance of testing with operating parameters to set at least one of a force measurement range, a minimum positioning resolution, an oscillation amplitude, an oscillation frequency, operating temperature, a clamping force, a retraction depth, a indentation depth, or a preload depth prior to a user using the portable testing device.

In another embodiment, the controller is configured to:
a. deform a region of a polymer material using the indenter probe;
b. calculate a specific compressive stiffness of the polymer material from measured displacement of the probe and measured force at the tip of said probe during deformation or at maximum indentation of said polymer material;
c. hold said probe to a predetermined indentation depth to allow for force relaxation; and
d. retract said probe to a predetermined intermediate position out of contact with the deformed polymer material and measuring time of recovery of deformation until contact of said polymer material with said probe reoccurs;
where the specific compressive stiffness and the time of recovery of deformation are indicators of degree of polymer aging.

In accordance with another aspect, there is provided a method for testing polymer aging, such as cable polymer aging, comprising the steps of: immobilizing a polymer material (such as a polymer jacket in the case of testing cable aging); deforming a region of the polymer using a probe;

calculating stiffness of the polymer from measured displacement of the probe and force at the tip of said probe during deformation; retracting said probe to a predetermined position and measuring time of recovery of deformation; wherein the stiffness and the time of recovery of deformation are indicators of degree of polymer aging.

In an embodiment, the method comprises heating a test location of the polymer material to a set temperature.

In another embodiment of the method, measuring the time of recovery until contact of the polymer material with the probe reoccurs comprises identifying the time between retracting the probe and recording a statistically significant force value above zero.

In another embodiment of the method, calculating the specific compressive stiffness comprises measuring displacement of a linear encoder.

In another embodiment, the method comprises securing the material with a clamp, and modifying the force between the clamp and the material to maintain a set force.

In another embodiment, the method comprises detecting a surface of the polymer material by extending the probe into contact with the polymer material to identify a zero position.

In another embodiment, the method comprises a preload phase comprising preloading the probe a distance into the polymer material from the zero position, and an indentation phase comprising advancing the probe to deform said polymer material while measuring force at the tip of the probe during deformation. The distance the probe is preload may be determined by a maximum force value between the probe and sample.

In another embodiment, the method comprises preloading a tester device with test parameters for the polymer material, the test parameters comprising at least one of indentation depth, temperature, clamping force, preload distance, and retraction depth.

In accordance with another aspect, a method of predicting remaining life of a polymer is provided. The method comprises testing a polymer to determine an indenter modulus (IM) or recovery time (RT) value; comparing the IM or RT value with benchmark data of the polymer; calculating a predicated value of the remaining life of the polymer. In an embodiment, the benchmark data is updated with the IM or RT value.

BRIEF DESCRIPTION OF THE FIGURES

FIGS. 4A-4D depict components of the portable polymer tester. FIG. 4A is a side view of an example drive assembly, 4B is a top view of the example drive assembly, and 4C is a side, cross-section of a part of the tester showing the jaw assembly holding a cable and a probe positioned within a hole in the fixed jaw of the jaw assembly. FIG. 4D is a cross sectional view of the portable polymer tester of FIG. 4A illustrating a probe in a retracted position.

FIG. 15 shows drawings of the back panel of a control chassis showing the mounting and wiring (15A is a face view and 15B is a perspective view).

FIG. 16 shows drawings of the side panel of a control chassis showing the mounting and wiring (16A is a face view and 16B is a perspective view).

FIG. 17 shows drawings of interior components of a control chassis showing the mounting and wiring (17A is an interior side perspective view and 17B is a top side perspective view).

DETAILED DESCRIPTION

Figure 1:
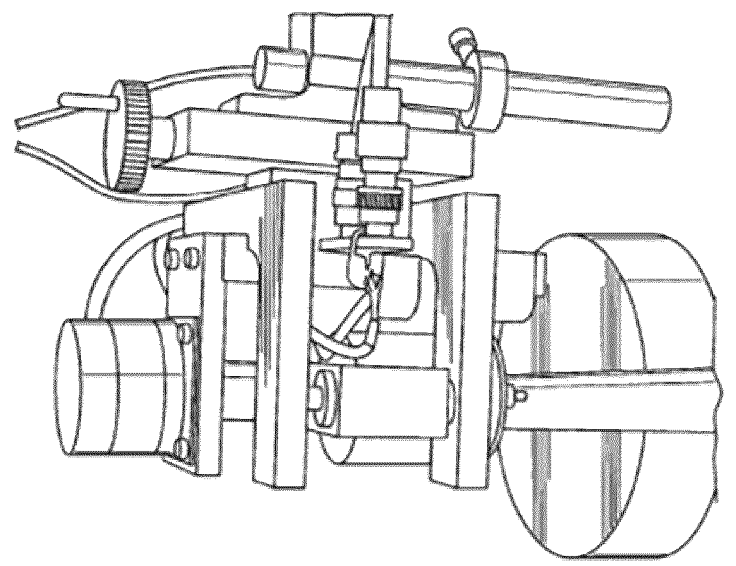
FIG. 1 is a photograph of the Elasto-Dynamic Spot Tester, a precursor tool to the device of the present disclosure.

The following description will primarily discuss cables, e.g. electrical cable, although it can be appreciated that the principles of aging and analysis described herein may also be largely applicable to wires, optical cabling or other components made of polymeric material.

Unless defined otherwise, all technical and scientific terms used herein have the same meaning as commonly understood by one of ordinary skill in the art to which this disclosure belongs.

Unless the context clearly indicates otherwise, as used herein plural forms of the terms herein are to be construed as including the singular form and vice versa.

The term "comprising" as used herein will be understood to mean that the list following is non-exhaustive and may or may not include any other additional suitable items, for example one or more further feature(s), component(s) and/or part(s) as appropriate.

Aging effects on a polymer forming a cable may be spatially generalized (i.e., affecting most or all portions of a given cable equally, such as for a cable located completely within a single room of uniform temperature), or localized (i.e., affecting only very limited portions of a cable, such as in the case of a cable routed near a highly localized heat source). The severity of these aging effects depends on several factors including the severity of the stressor, the materials of construction and design of the cable, and the ambient environment surrounding the cable. Detailed discussions of electrical cable aging may be found in a number of publications including Kim, J-S., "Evaluation of Cable Aging in Degradation Based Plant Operating Condition" (2005) *J. Nucl. Sci. Technol.* 42(8) 745-753 and SAND96-0344 "Aging Management Guideline for Commercial Nuclear Power Plants—Electrical Cable and Terminations" prepared by Sandia National Laboratories/U.S. Department of Energy, September 1996. Discussions regarding optical cable aging may be found, inter alia, in Electric Power Research Institute (EPRI) publications and telecommunications industry literature.

A typical instrumentation and control (I&C) cable consists of multi-conductor assemblies insulated with fire-retardant material with an overall shield and an outer jacket. In addition, the cables used in plants such as nuclear reactor stations may contain tape wraps that enhance electrical, mechanical, or fire protection properties.

Insulation and jacket materials used for I&C cables are polymers that contain additives and fillers to improve aging resistance, electrical, mechanical and fire retardant properties. Widely used jacket and insulation materials include polyvinyl chloride (PVC), chlorosulphonated polyethylene (CSPE), also know as Hypalon™ for the jackets and cross-linked polyethylene/polyolefin (XLPE/XLPO), and ethylene-propylene based elastomers (EPR, EPDM) for the insulation.

The level of degradation of the insulation and jacket materials attributed to aging depends upon the polymer compound used (presence of adequate additives, etc.), the pre-service (storage) and service environmental conditions (temperature, radiation, mechanical stress, humidity), and the elapsed service life (time factor). The main chemical aging mechanisms of polymers result from scission, cross-linking, and oxidation reactions at the molecular level. The scission of alkoxyl or peroxide radicals usually leads to the scission of one macromolecular chain into two new chains. Cross-linking refers to the formation of covalent links between adjacent macromolecules and the formation of a dense network of chains. Oxidation reactions, which start from the formation of free radicals (because of the initial break of a covalent link under the effect of temperature and/or radiation), can lead either to chain scission or cross-linking. The organic materials usually undergo physical changes such as hardening and loss of flexibility as a result of exposure to heat and radiation. Another type of physical aging mechanism due to thermal aging is the evaporation and possible migration of plasticizers in PVC materials.

The level of degradation of a material can be assessed by tracking the changes of material properties. Some standard techniques used include: visual and tactile inspections, tensile tests, indentation tests, differential scanning calorimetry, Fourier Transform Infrared Reflectance (FTIR) Spectroscopy, measurement of swelling ratio, mass loss, plasticizer content, dielectric measurements or change in density.

One of the most commonly used laboratory techniques to assess degradation is tensile testing, which consists of comparing the percentages of elongation at break (EAB) or the tensile strength for unaged and aged samples. EAB is a proven degradation indicator and an accepted parameter for the estimation of the residual lifetime of a cable. End-of-life criteria based on this parameter are well established. An ultimate EAB of 50% is usually used as an end point criterion [International Atomic Energy Agency, 2000, "Assessment and Management of Ageing of Major Nuclear Power Plant Components Important to Safety: In-Containment Instrumentation and Control Cables", Volume 1, IAEA-TECDOC-1188, December.]. The main disadvantage is the large sample size required and the destructive aspect of the technique.

The number of techniques available for on-site monitoring is limited because of the strong requirement from station personnel to use non-destructive and non-intrusive techniques. Another difficulty is that some of the instruments typically used in the laboratory environment are not easily ported to site. Various panels of international experts were formed to review existing data and the state of advancement of current condition monitoring techniques [IAEA-TEC-DOC-1188, 2000 (above) and Nuclear Energy Agency, Committee on the Safety of Nuclear Installations, 2004, "Research Efforts Related to Wire Systems Aging in NEA Member Countries", Report NEA/CSNI/R, (2004)12, August 11]. These panels provided guidelines and recommendations with respect to the orientation of Research and Development (R&D) programs to address cable aging issues. The recommendations for future research and development efforts to address this issue were as follows [Report NEA/CSNI/R, 2004 (above)]:

Continue the development of new, effective, in-situ condition monitoring techniques for installed wire systems that can be used to determine the current condition of a wire system and predict its useful life. In this regard, advanced electrical, optical, ultrasonic and aerospace technologies should be evaluated and developed for nuclear plant applications; and Correlate mechanical wire system properties to electrical properties to better understand the significance of reaching the limits of mechanical properties for aged insulating materials.

Some of the physical techniques used to analyse cable polymer aging, such as the measurement of the tensile strength or elongation-at-break of the insulation material are inherently destructive and require a specimen of the aged cable for testing. However, there are some non-destructive physical techniques, including the measurement of compressive modulus, torsional modulus, or rigidity under bending, that do demonstrate a correlation between the aging of the cable and the measured parameter (especially for low-voltage cable), and can be practical to apply during operational conditions. For example, the measurement of compressive modulus by way of instruments such as the Indenter Polymer Aging Monitor can be useful for measurement of cable polymer aging. See, for example, EPRI TR-104075, "Evaluation of Cable Polymer Aging Through Indenter Testing of In-Plant and Laboratory Aged Specimens," prepared by the Electric Power Research Institute, January, 1996 for a discussion of the correlation between outer jacket and conductor physical measurements.

Portable indenters may measure material stiffness or hardness. However, for some polymer-based materials, the stiffness/hardness remains unchanged with increasing irradiation level, even though basic material properties such as the elongation at break clearly indicate a continuous degradation resulting from this stressor. Likewise, when polymeric components are subjected to thermal aging, the stiffness sometimes increases initially but quickly reaches a saturation value, even though it is known that further degradation continues to occur. Therefore, the indenters currently available are not ideally suited for the monitoring of cable aging.

In an indenter made by Electric Power Research Institute (EPRI) the limit of indentation depth is controlled based on the value of the force measured. Therefore the indentation depth varies between an unaged and an aged elastomer. This prevents the study of recovery of the elastomer for a fixed reference indentation depth. The EPRI indenter can be used to monitor a portion of the force signal after the maximum force is reached and the force starts to relax and decay. The probe can be held in position during the relatively short relaxation period that is being analysed. However, the force relaxation features do not change significantly with increased aging of the material.

With the EPRI indenter, once the relaxation information is acquired, the probe is slowly driven back to original position and no further investigation takes place. Because of the nature of the drive system, the probe cannot be retracted instantly or quickly from a given reference position. Therefore it is not possible to create conditions that permit assessment of recovery of deformation following the force relaxation phase when using the EPRI indenter.

In addition, previous portable indenters do not offer the flexibility of changing the type of excitation signals, nor programming a variety of sequences of events for the indenter probe. This is detrimental to the systematic identification of optimal input parameters, set-ups, and output parameters in terms of their sensitivity to polymer degradation.

The portable polymer tester ("PPT") of the present disclosure was developed to take advantage of an indentation technique that includes the option of programming and controlling a variety of input parameters, a variety of sequence of events for the probe displacement and the access to a variety of output parameters. The PPT of the present disclosure is a controllable tool (in comparison to tools currently in use) that can be configured to measure parameters most prone to tracing the degradation of polymer-based components and is fully portable to allow for the measurement of these parameters on site.

The PPT of the present disclosure incorporates means for classical measurement of material stiffness (or modulus) via linear drive of an indenter probe into the material (once the probe has been slightly preloaded onto the sample surface). The stiffness parameter is derived from simultaneous acquisition of the probe reaction force and probe displacement during the indentation phase. The PPT also incorporates means for measurement of post-indentation parameters such as force relaxation and recovery of deformation.

The indentation technique for monitoring polymer or elastomer material degradation, is a quantitative non-destructive monitoring technique that basically comprises driving a probe tip onto the surface of the polymer or elastomer material, for example a cable jacket or cable insulation material [IAEA-TECDOC-1188, 2000 (above)]. The technique provides one or more of the following advantages:

portable instruments can be developed,
   the measurement is quick,
   data are easy to analyse, and
   the measurement can be taken on electrical equipment
      that is electrically live and in operation.

The PPT may provide parameter measurement of a cable insulation using Indenter Modulus (IM) per IEC/IEEE international standard IEC/IEEE 62582-2 and for measurement of Recovery Time (RT).

During the indentation phase, the force and the probe displacement are measured to derive a specific compressive stiffness parameter, also called the Indenter Modulus (IM). This parameter shows some correlation with polymer or elastomer degradation for most cable materials used in, for example, nuclear power plants, but the sensitivity of the technique can be limited. Two notable exceptions are materials for which the indenter modulus values tend to stay constant (e.g., irradiated PVC) or only change for a severely degraded material (e.g., thermally aged XLPE).

An on-site laboratory indenter, referred to as the Elasto-Dynamic Spot Tester (EDST), has been previously developed. Initially, the EDST was used to derive the elastomer spot stiffness during indentation and also to study various post-indentation visco-elastic properties, such as the percentage of force relaxed after a given time and the time to recover a given percentage of the initial deformation. A photograph of the EDST used for cable aging assessment on site is shown in FIG. 1.

Certain features of the EDST have been incorporated into the PPT of the present disclosure. The portable polymer tester of the present disclosure is compact, has the ability to be used in any orientation and incorporates drive, control, feedback, and force/displacement measurement systems. The PPT may integrate methods for using the indentation probe in an oscillation mode to access parameters such as the specific dynamic stiffness and the amount of lag (or phase) measured between the force and displacement signals.

Figure 3A:
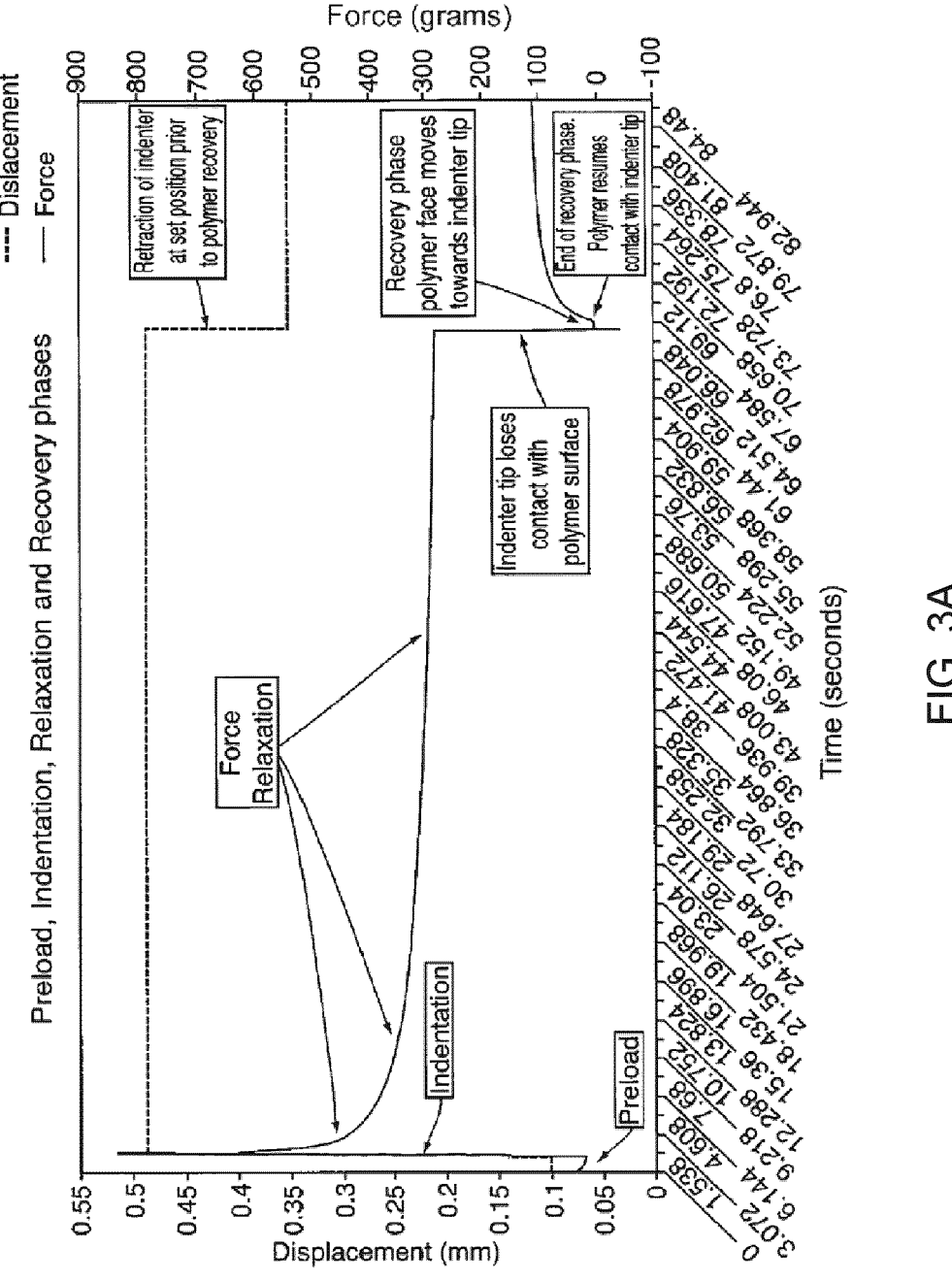
FIG. 3A graphically depicts an indenter test cycle according to one embodiment of the present disclosure, and FIG. 3B graphically depicts an indenter test cycle according to one embodiment of the present disclosure and illustrates the location of the indenter probe during the surface detection, preload, indentation, force relaxation, and deformation recovery phases of the test cycle.

The PPT includes a system for programming the indenter probe displacement profile and controlling the probe position to derive post-indentation parameters. The indentation parameters are similar to those assessed using the EDST. They include the force relaxation (once the material has been indented), and the time to recover a set percentage of initial deformation (once the indenter is quickly retracted to a preset position following the relaxation phase). A typical PPT sequence is outlined in FIGS. 3A and 3B, and described in more detail below. The results obtained from the use of PPTs according to the present disclosure, demonstrate that the PPT has good repeatability and that the test results are consistent with results obtained using the EDST.

Construction of the PPT is made taking into consideration the possible tool exposure to contaminated, above ambient temperature environment when used under extreme conditions, such as at a nuclear site. For example, in accordance with specific embodiments of the disclosure, the portable polymer tester includes a housing containing the drive, control, feedback, and force/displacement measurement systems, where the housing is constructed of material suitable to withstand testing conditions and to protect the interior components from the testing conditions.

Portable Polymer Tester Components

As noted above, the PPT of the present disclosure comprises a drive, control, feedback, and force/displacement measurement systems. Generally, the components of the PPT are contained within a Head 11 of PPT 10 which may be connected by an umbilical cable to a Controller 35. The Head 11 is the part of PPT that contacts and measures the cables while the Controller may be attached to a User's belt or carried on a shoulder strap, or in a backpack, or other means. The PPT may be powered by a battery pack on a belt fastened around the User's waist, or be powered by an ac/dc power supply for continuous use.

The Controller may include a Memory Card, two Motor Controllers, an Ethernet and USB connection. The Head includes a Clamping Assembly and a set of easily interchangeable clamps for holding and aligning samples on the tool. Clamps may be used one at a time depending on the sample shape and size. The clamp is attached to an arm that can be moved back and forward by a motor that can be setup to automatically stop when the clamp reaches a certain force against the sample. Clamps of various shapes and sizes may be provided to secure samples having different shapes/sizes. For example, the clamp may be configured to secure samples having a flat, round, cylindrical, oval, or trapezoidal cross-section, or any other shape.

The Head of the PPT may include a housing surrounding the drive, control, feedback, and force/displacement measurement systems, jaw assemblies for holding samples, such as cables, in place during testing, and a probe. The probe can be interchanged with probes of various tip sizes suitable for testing polymer materials with different characteristics. In one example, the probe can be interchanged to accommodate testing of polymer containing-cables with different diameters and polymer jackets. The PPT further includes an internal power source (e.g., a battery) or means for attachment to an external power source (e.g., an AC power plug).

The head of the PPT may also provides a threaded mounting point, to accommodate standard support equipment like camera tripods. This may be used to support the PPT head during measurements instead of requiring the operator to hold the head. This provides a more stable method of supporting the PPT head and helps to eliminate motion or vibrations during testing.

The components of the PPT of the present disclosure are described in more detail below, with reference to the Figures.

Indenter Drive System

The Intender Drive System ("drive system") 20 incorporated in the PPT includes a probe 50 that contacts and indents a sample, e.g. cable sample, and a motor 30 for instant or fast retraction of the probe to permit measurement of time of deformation recovery. In an embodiment, with reference to FIG. 4D, the motor 30, of drive system 20, may be an electric direct current servo drive with a linear rail, a ball screw drive, or linear induction motor. A piezo actuator may also be used for precise movement of the probe. In an embodiment the motor may retract the probe with an approximate speed of 10 mm/sec.

In another embodiment, the drive system includes a motor, linear slide, high resolution optical encoder system, motion controller and motor driver/amplifier. The arrangement of these components forms a closed-loop control system. More specifically, the motor is preloaded against a manufacturer specified surface that is affixed to the linear slide. This preload force allows the motor to provide a no-slip motion of the slide in any orientation. Moreover, the linear slide includes a scale to allow the measurement of position. The optical linear encoder system comprises a readhead sensor that "reads" the scale and sends the reading to an interpolator in order to increase the positioning accuracy. This position information is then transferred by electrical means to the motion controller. The motion controller employs algorithms to command the motor by way of the motor driver/amplifier until the position error is virtually zero or within an acceptable tolerance, depending on the application of the PPT.

In accordance with one embodiment of the disclosure, the drive system is manufactured according to the following specifications:

Stage travel of at least 5 mm

Step resolution of about 0.010 μm to about 0.1 μm

Measurement resolution of about 0.010 μm to about 0.1 μm

Motor dynamic stall force of about 30N to about 34N

Motor static hold force of about 26N to about 30N

Motor operating temperature range of −10 to 50° C.

In accordance with another embodiment, the drive system is manufactured according to the following specifications:

Stage travel of approximately 40 mm

Step resolution to about 10 nm

Measurement resolution: approximately 10 nm

Motor dynamic stall force: about 32 N

Motor static hold force: about 28 N

Motor operating temperature range: about 0 to about 50° C.

In selecting the parts for the drive the overall size and weight of the handheld portion of the PPT needs to be considered as the components will affect both the size and weight of the PPT. Suitable motor types include, but are not limited to voice coil motors, linear shaft motors and ceramic servo motors.

Figure 4A:
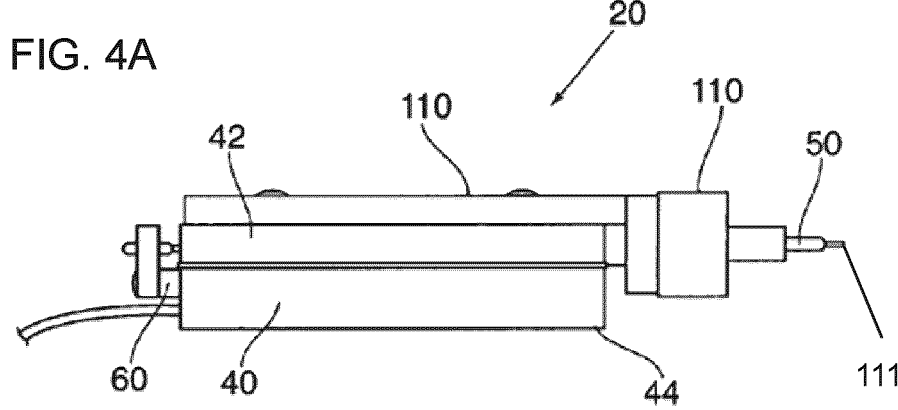
Figure 4B:
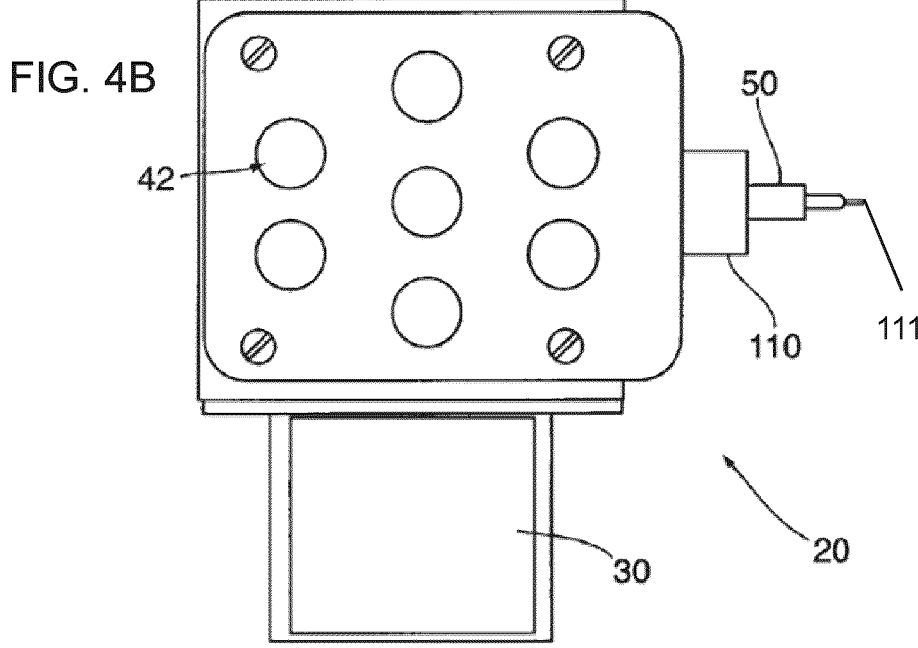
Figure 4C:
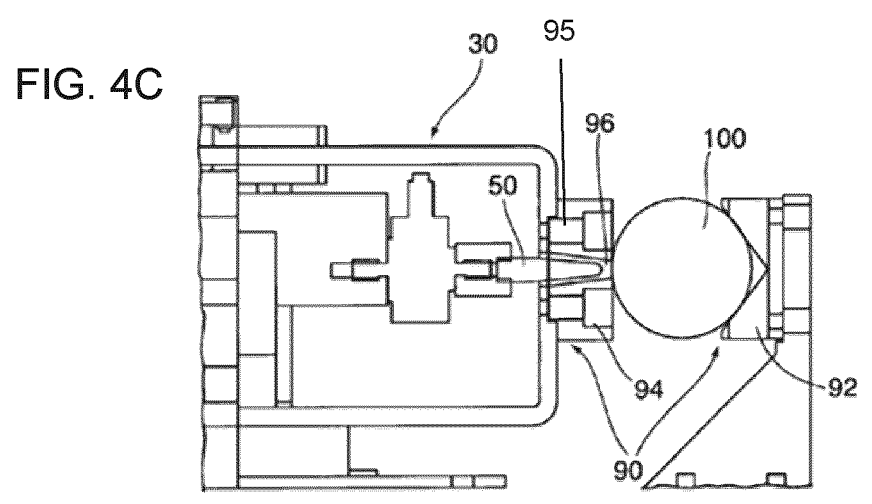

With reference to FIGS. 4A-4C, a specific example of a drive system 20 of a PPT 10 of the present disclosure integrates a motor 30 (e.g. a ceramic servo motor) into a nanostage 40, which facilitates instant/fast retraction of the probe 50 during use of PPT 10. Nanostage 40 includes stage table 42 and stage base 44. It is a packaged drive system that eliminates the need for a large number of parts to manufacture or assemble. The stage configuration utilizes a linear slide 60 with crossed roller bearings and a linear optical encoder (not shown). Nanostage 40 is provided completely assembled. Ideally, the ceramic servo motor 30 used is a state of the art device capable of high resolution and high dynamic performance.

Force/Displacement Measurement System

As shown in FIGS. 4A, B, D, and E the force/displacement measurement system includes a miniature load cell 110 mounted to the front of the slide and a load cell signal conditioner (not shown) used to measure the force on the probe tip during testing. A linear encoder in the drive system may provide the probe position measurement.

In an embodiment, a linear encoder 111 is provided in a non-deflecting part of drive system 20. Previous PPT systems which do not account for deflection within the drive system may be prone to inaccurate measurements. In an example, linear encoder 111 is between the load cell 100 and a tip of probe 50, or between the driver (e.g. linear stage 40) and the tip of probe 50. In an example, linear encoder 111 may be proximate to the leading edge (e.g. at or near the tip) of probe 50, which measures the position and motion of the tip of the probe. Locating linear encoder 111 in the drive system at a location between the tip of probe 50 (inclusive of the probe tip) and the components that deflect (e.g. load cell 110 and linear stage 40) provides absolute measurement of the probe tip position which may results in greater accuracy of measurement in comparison to locating the linear encoder at another position in the drive system that is subject to deflection when probe 50 is in use. When in use, probe 50 imparts force to load cell 110 which may deflect a distance. Similarly, other components in drive systems 20 (e.g. linear stage 40) may also deflect a distance when probe 50 is in use for testing a sample. Accordingly, a linear encoder located in drive system 20 at a position that deflects will record its position including the distance caused by the deflection of load cell 110 and driver. Positioning linear encoder 111 in a non-deflecting part of drive system 20 (e.g. on probe 50), may remove measurement inaccuracy that may otherwise have been caused by deflection of load cell 110 and the driver.

Sample Retaining Assembly

During testing using the APPT of the present disclosure, it is often necessary to hold the sample in place. Accordingly, the APPT of the present disclosure optionally comprises a sample retaining assembly. The configuration and components of the sample retaining assembly will vary based on the application of the APPT and the type of sample to be tested.

Figure 2A:
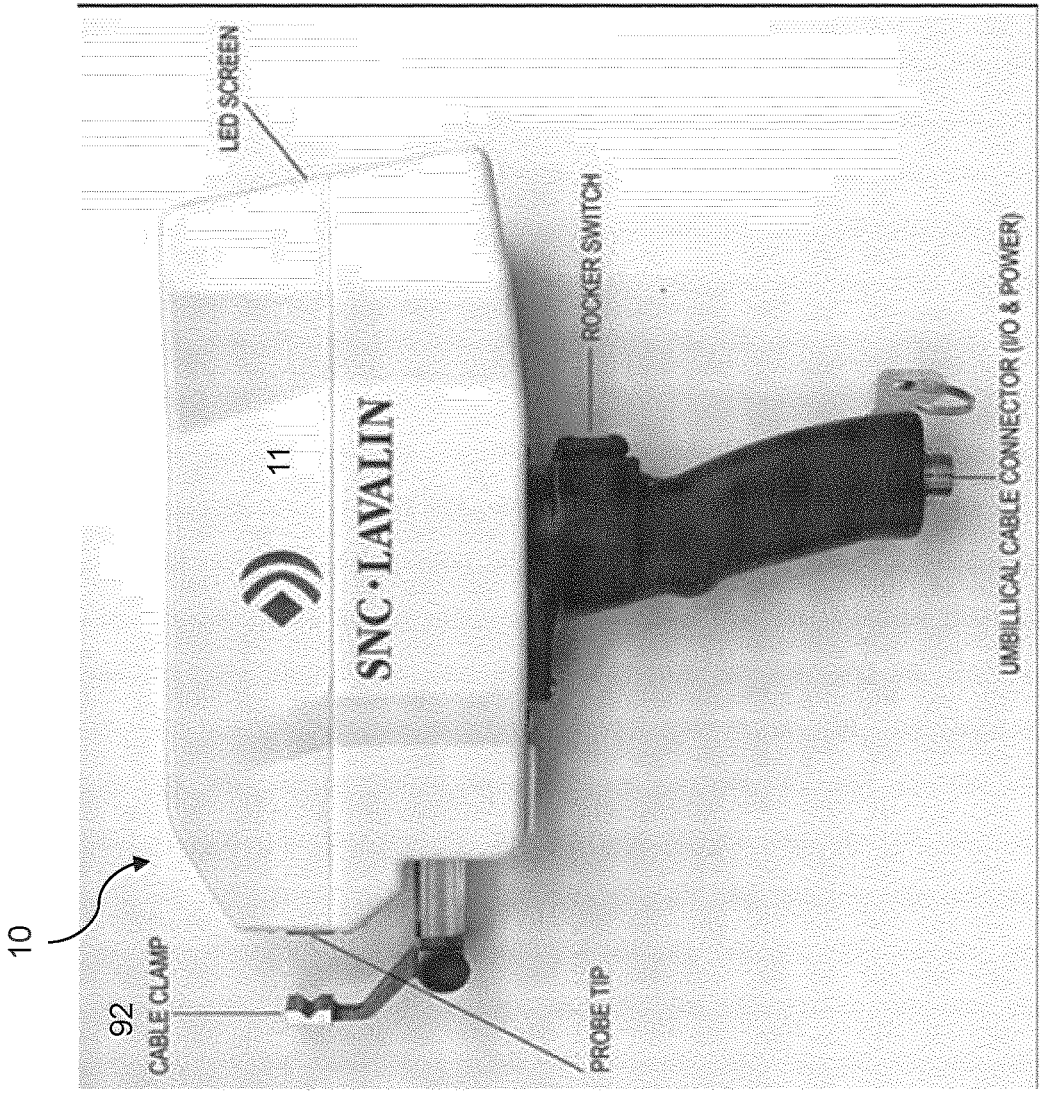
FIGS. 2A and 2B are each perspective views of a head of a portable polymer tester according to one embodiment of the present disclosure.
Figure 2B:
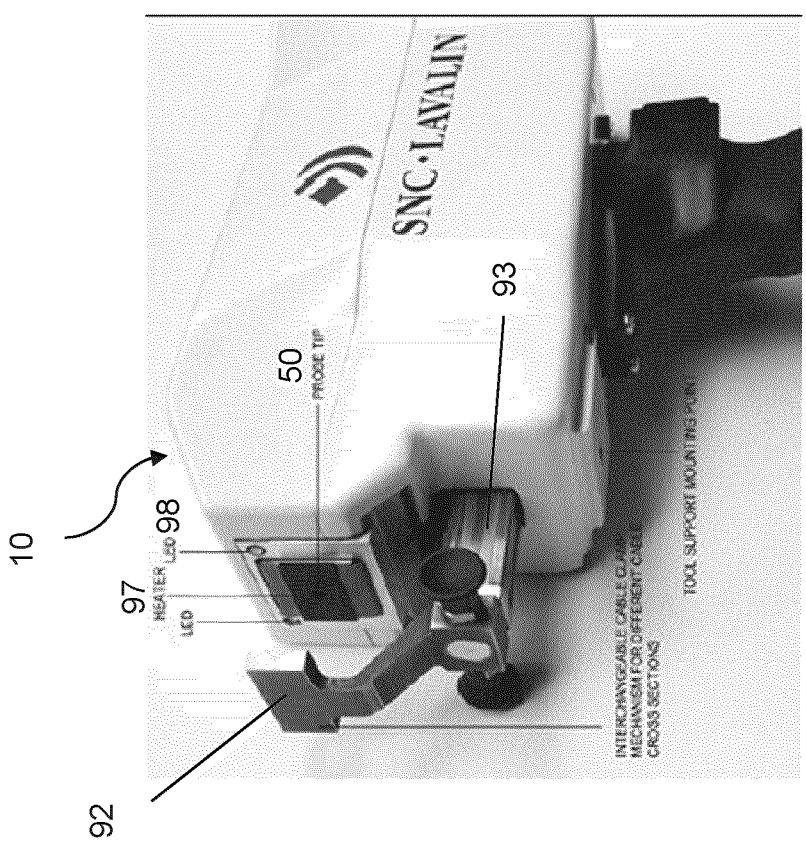
Figure 2C:
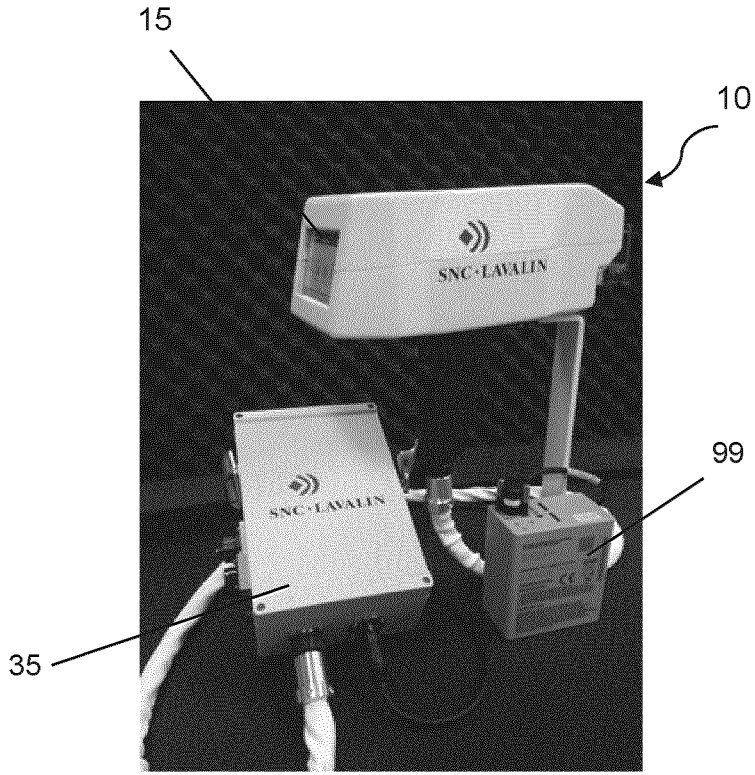
FIG. 2C is a perspective view of the portable polymer tester illustrating a controller of the portable polymer tested connected to the head and a battery. The head of the portable polymer tester is connected to the controller to receive electrical signals, control commands from the motion controller and collect process data that may be scaled and transferred back to the controller.
Figure 4D:
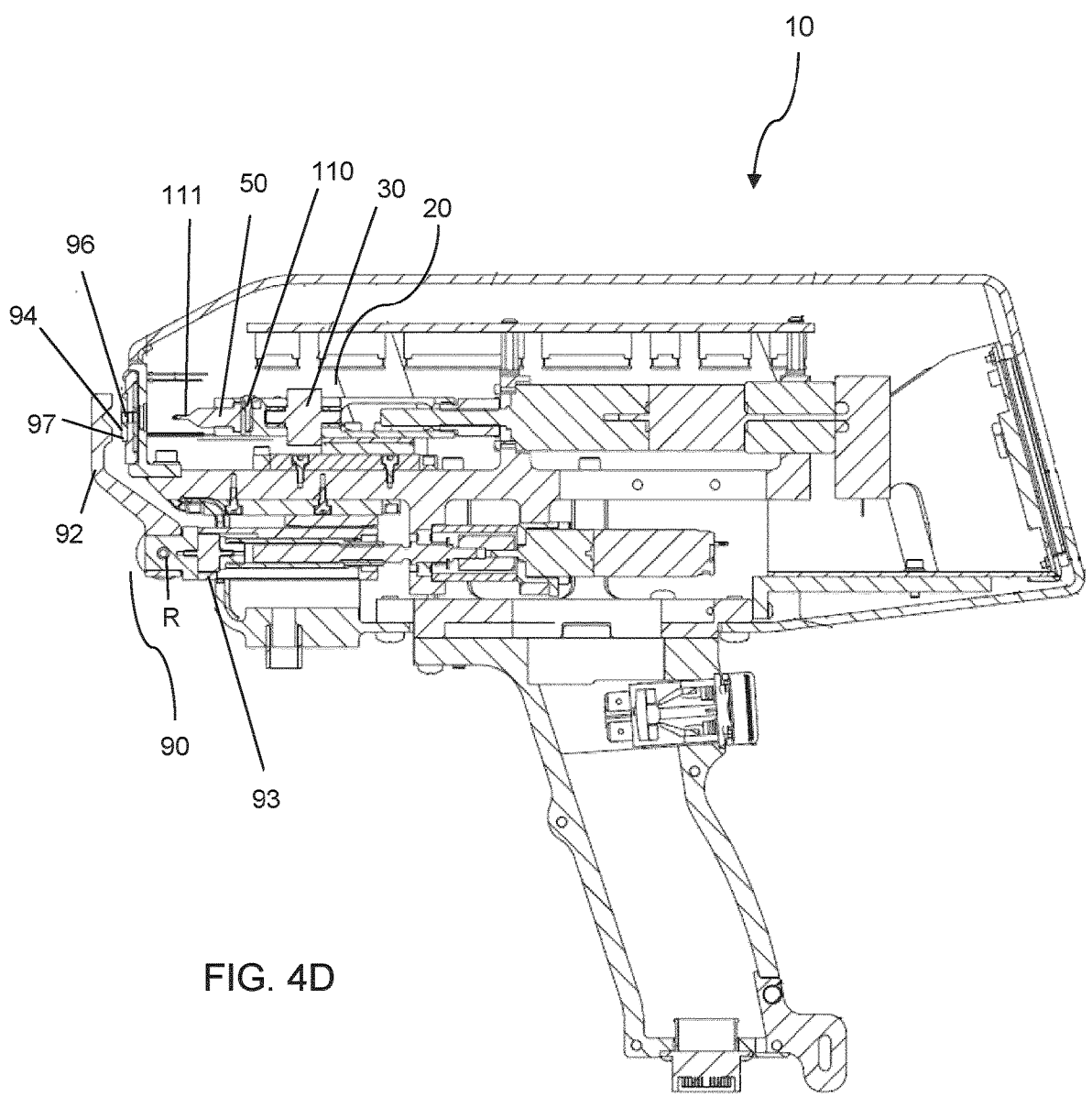

With reference to FIGS. 2A, 2B, 4C. and 4D, PPT 10 may provide a sample retaining assembly suitable for holding a cable or the like during testing. As shown in FIGS. 4C and 4D, such a sample retaining assembly can be a jaw assembly 90 that includes a moveable clamping jaw 92 and a stationary clamping member 94. The jaw assembly further includes mechanisms for adjusting the position of the moveable clamping jaw 92 to clamp cable 100 during testing. For example a cable may be clamped between clamping jaws 92 and stationary member 94 as shown in FIGS. 4C and 4D. Clamp 92 may be mounted on a distil end of arm 93 which may move clamp 92 toward or away from probe 50 to secure or release a sample, e.g. cable 100 shown in FIG. 4C. Arm 93 may be driven by a motor, linear actuator, or other suitable device to provide precise positioning clamp 92. Clamp 92 may also be configured to be rotatable about arm 93 to accommodate accepting or releasing a cable. For example, clamp 92 may be rotatable about point "R" in FIG. 4D. As depicted in FIGS. 4C and 4D, stationary clamping member 94 includes through hole 96 through which probe 50 advances to contact and indent the polymer jacket of cable 100.

Clamp Force Measurement System

Clamp 92 is provided to secure a sample, e.g. a cable, to be tested by PPT 10. Clamp 92 may be moveable to secure samples of various size. For example, clamp 92 may be connected to a distil end of arm 93 which may move in a distil or proximate direction to secure the sample between clamp 92 and stationary clamping member 94 of the PPT. See FIGS. 2B and 4C. Clamp 92 may also be interchangeable with clamps of different sizes or shapes to accommodate samples are various sizes and shapes. The clamping force applied to the sample has significant impact on consistency of measurements. Applying a clamping force too strong may cause a surface of the sample, e.g. cable 100, to bulge into hole 96 causing increased tension in the polymer at the sample point and erroneous results. Applying a clamping force too weak may cause the sample, e.g. cable 100, to move during testing which would also create erroneous results as movement of probe relative to the sample would be inaccurately measured.

In an embodiment, a closed loop control system is provided to secure the sample for testing. The closed loop control system comprises a load cell, and an actuator (not shown) e.g. a direct current motor driving ball screw or linear actuators, to control the position of clamp 92 with respect to stationary clamping member 94. Load cell 95 of the closed loop control system for clamp 92 may be located in jaw assembly 90 or any other suitable location to measure the clamping force on the sample. The closed loop control system may be configured to maintain a constant force applied to the sample, e.g. cable 100. When in use, the actuator of the closed loop control system may increase force applied by clamp 92 to the sample, e.g. cable 100, until a set force is reached. Because some samples may comprise polymeric material that may relax or deform over time causing force between clamp 92 and the sample to decrease, load cell 95 may detected the decrease and cause the actuator increase the clamping force to meet the set force.

The clamping force set point may vary, e.g. based on the type of sample material. And may be pre-set and limited by the PPT software. Once the sample, e.g. cable 10, is fixed into proper position, probe 50 may move to Start Position shown in FIG. 4C. The Start Position is a pre-set location where the probe is close to the sample but not touching it. From the Start Position the probe travels forward to detect the sample surface.

Surface Detection

Figure 4E:
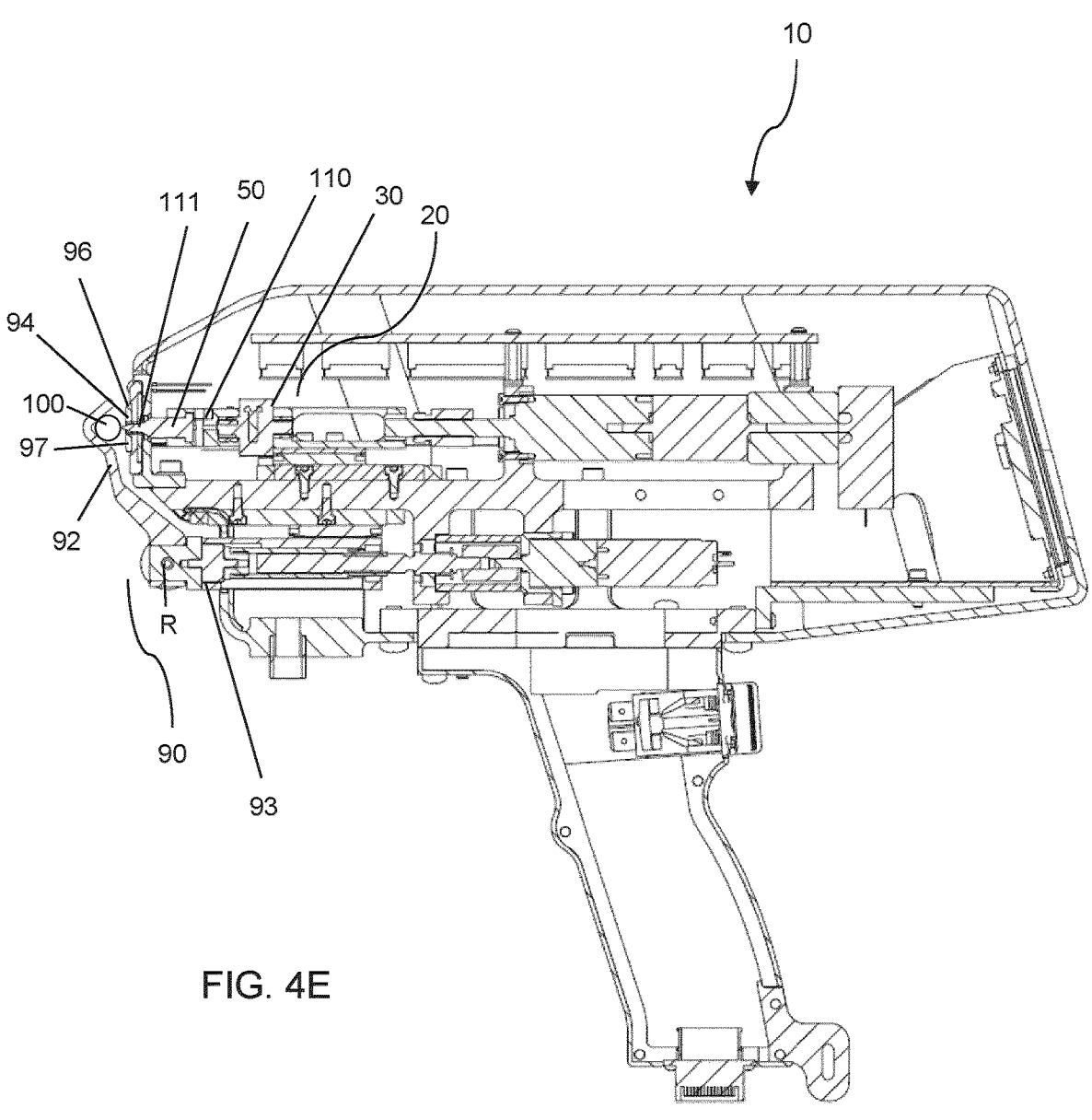
FIG. 4E is a cross section view of a portable polymer tester illustrating a probe in an extended position.

From the Start Position (shown in FIG. 4D), PPT 100 may be configured to have an automated sequence for surface detection to provide accurate results and reduce human error associated with hand adjusted surface detection systems. In an embodiment, probe 50 may be advanced toward the sample, e.g. cable 100, to detect a surface of the sample (shown in FIG. 4E). During the surface detection mode of operation, the indenter probe tip may be advanced and brought into contact with a surface of the sample. Contact with the surface may be determined when a detection force is reached, e.g. 0.2 N. The detection force may be measured by load cell 110. Once the surface is detected the position of the probe is recorded and the linear encoder 111 is zeroed. Accurate measurement of the surface of the sample provides more accurate and repeatable data that in turn yields more accurately calculated RT and IM values.

Once the surface of the sample is detected, PPT 10 may be configured to preload a distance into the sample surface or until a force limit is reached. Accurate measurement of the sample surface position and pre-load distance is important as a difference of a few microns can affect the measurement.

Control System

The control system includes a motion controller and a control software program 112 used to provide control and feedback for the force/displacement measurement system. The operating parameters are selected taking into consideration the sample type (e.g., cable type(s)) to be tested (e.g., size, polymer, etc.) and the location(s) or environment(s) of testing. In accordance with a specific embodiment of the present disclosure, the operating parameters for the PPT may be as follows:

Force measurement range of about 0 to about 20 N.
Minimum positioning rate of about 5 mm/s.
Minimum positioning resolution of about 0.1 μm.
Oscillation amplitude of about 1 to about 100 μm.
Oscillation frequency of about 0.1 to about 100 Hz.
Operating temperature of about 15 to about 50° C.
Clamping force.
Retraction depth of 60%-90% of indention depth
Indention depth
Preload depth The test sequence parameters and data collection is controlled using a computer that may be integrated with the Head or Controller of the PPT. The control software program may be loaded in advance of testing with operating parameters prior to a user using the PPT in the field to save time.

The operating parameters may be based on the types of cables to be tested to provide increase repeatability of results.

Figure 20:
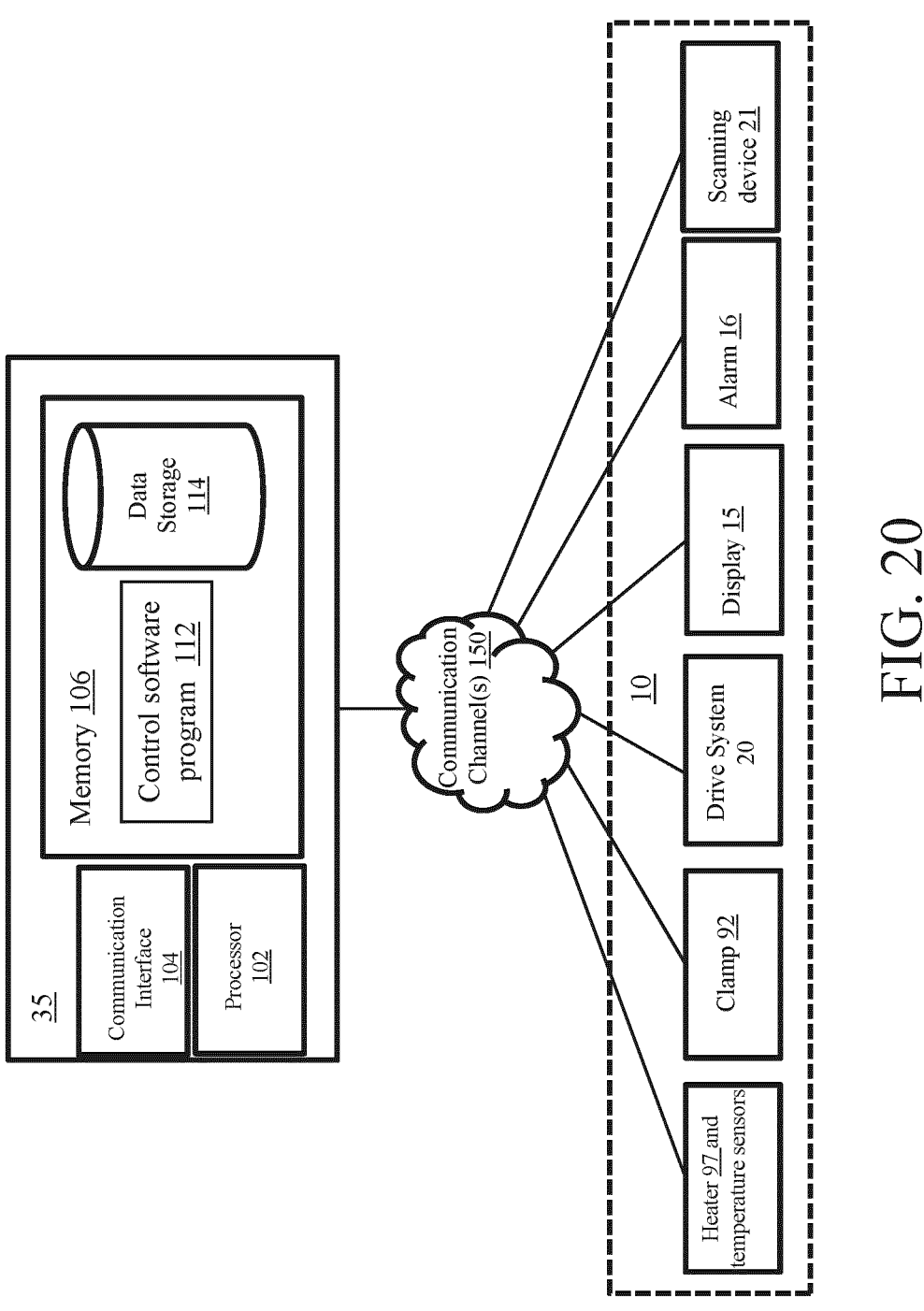
FIG. 20 is a schematic view of a control system for controlling a portable polymer tester in accordance with an embodiment of the present disclosure.

FIG. 20 shows an example control system for a PPT 10. Controller 35 includes a processor 102 configured to implement processor readable instructions that, when executed, configure the processor 102 to conduct operations described herein. The processor 102 may be a microprocessor or microcontroller, a digital signal processing (DSP) processor, an integrated circuit, a field programmable gate array (FPGA), a reconfigurable processor, a programmable read-only memory (PROM), or combinations thereof. The controller 35 includes a communication interface 104 to communicate with other computing or sensor devices, to access or connect to resources, or to perform other computing applications by connecting to a connection capable of carrying data. In some examples, the communication interface 104 may include one or more busses, interconnects, wires, circuits, and/or any other connection and/or control circuit, or combination thereof. In some embodiments, the one or more busses, interconnects, wires, circuits, or the like may be the network of conductive and non-conductive fibers of a smart textile. An alarm 16 described herein, may be any indication provided to a user of the wearable device that corrective action should be taken. Non-limiting examples of alarms are visual alerts on a display or a light (e.g. lights 98) of PPT 10; vibrations from a vibration actuator of the wearable device; or auditory alerts from a speaker of the wearable device.

Controller 35 may be coupled to any of the components the PPT 10. The communication channel(s) 150 may include any wired or wireless communication path, such as an electrical circuit. In some embodiments, the communication channel(s) 150 may include one or more busses, interconnects, wires, circuits, and/or any other connection and/or control circuit, or a combination thereof. In some embodiments, the communication channel(s) 150 may include a wired or a wireless connection, a combination thereof, or the like. In some embodiments, the communication channel(s) 150 may include a Bluetooth® connection, a Bluetooth® low energy connection, a short-range communication connection, or the like.

Controller 35 may include memory 106. The memory 106 may include one or a combination of computer memory, such as static random-access memory (SRAM), random-access memory (RAM), read-only memory (ROM), electro-optical memory, magneto-optical memory, erasable programmable read-only memory (EPROM), and electrically-erasable programmable read-only memory (EEPROM), Ferroelectric RAM (FRAM) or the like.

The memory 106 may store an control software program 112 including processor readable instructions for conducting operations described herein. In some embodiments, the control software program 112 may cause the test sequence parameters and data recorded by the PPT to be recorded in memory for subsequent analysis.

In some embodiments, the PPT 10 includes a scanning device 21 such as a tag reader, barcode scanner, RFID reader, imaging device, etc. for a scanning one or more cable or other sample identifier. For example, a cable can have a tag or can be imprinted with an identifier such as a barcode, RFID, text identifier, etc. Upon scanning the sample identifier, the control software program 112 is configured to select and/or utilize the operating parameters associated with that identifier in the PPT's database in data storage 114.

In some embodiments, the sample identifier can identify the sample facility, location within the facility, environment conditions and/or uniquely identify the particular sample/cable.

In some embodiments, the control software program 112 is configured to store the test results in association with the specific sample/cable so that results can be tracked over time. Controller 35 may include a data storage 114. In some embodiments, the data storage 114 may be a secure data store. In some embodiments, the data storage 114 may store received data sets, such as measurement data, temperature data, or other types of data. In some examples, the data storage 114 may store data associated with criteria for analyzing received data sets. In some embodiments, the stored criteria may include criteria that may be used for generating alarms to alarms 16 that indicate that the measurement was done correctly or incorrectly.

In an embodiment, the control software program 112 may perform a preliminary test of the recorded test sequence parameters and data by calculating IM and/or RT. The IM and/or RT values may be calculated immediately to provide a user with the IM or RT value. IM and RT values, obtained from an experiment, may be compared immediately with an expected value for each of the IM and/or RT values to provide the user with an indication that the measurement was done correctly. Expected values of the IM or RT values may be determined in several ways. Recorded IM and/or RT values may be compiled to generate a benchmark to trend data in the form of a graph (e.g. FIGS. 7A, 7B, 7C) or a formula representing the curve of the trend data. As such, expected IM and RT values may be determined by extrapolating trends from previously gathered test data for a specific cable. The calculated IM and/or RT can then be compared to the stored IM or RT values in the database. Specific IM and/or RT values determined from a sample may be compared with expected IM and/or RT by statistical analysis, such that if the IM and/or RT values from the sample falls within a range of expected values then the experiment may be considered to have been performed correctly. The user may then be immediately notified of the correct experiment, e.g by alarm 16. If the IM and/or RT values from the experiment falls outside the range of expected values, then the user may be prompted to re-start the experiment to obtain accurate test data. Performance of the preliminary test for IM and/or RT encourages accurate data quality capture.

The determination of recovery time may be explained with reference to FIG. 7A. The measurement of recovery time begins upon retraction of the indenter probe to a set position. As the test material recovers, force applied to the probe by the material is effectively zero until the recovering sample once again contacts the probe indicating the end of the recovery phase. However, accurately recording the end of the recovery phase may be difficult as force measurement is statistically noisy and determining the exact moment of contact between the probe and recovering sample material may be difficult to decipher. In an embodiment, the control software program 112 determines the end of the recovery phase when a statistically significant force value above the noise is returned. In another embodiment, control software program 112 determines a range of noise values and determines the end of the recovery phase when force value is returned above the range of noise values. In another embodiment, the control software program 112 determines a best-fit line or curve to the measured data and calculates the zero force intercept.

In some embodiments, control software program 112 is configured to perform a test sequence by adjusting control operating parameters based on the object being tested. For example, in some embodiments, control software program 112 adjusts the retraction depth for different objects/materials. In some situations, this may result in more accurate or more consistent results for materials which are more or less resilient. Providing a larger retraction depth can provide a longer RT period for materials which recover quickly, while smaller retraction depths can provide a shorter RT period for materials which recover more slowly. In some situations, by providing a right-size retraction depth, application 112 may provide better resolution or reduce variance relative to the detected values.

Continuing the above example, in some embodiments, control software program 112 is configured to adjust the temperature of heater 97. In some situations, the temperature of heater 97 may be set to a constant (same) value each instance a sample is tested to enable deterioration of the sample to more accurately be measured over time at the same temperature. As temperature may influence IM and RT values, testing a sample at the same temperature over time may reduce error and provide results that are repeatable and can be compared to previous tests. In some situations, control software program 112 may be configured to perform a sequence of multiple tests at different temperatures and adjust heater 97 to heat the sample to the different temperatures for each of the sequence of tests.

In some embodiments, control software program 112 is configured to adjust the clamp force between clamp 92 and the sample to maintain a constant value. For example, the clamp force is adjusted for different objects/materials. In some situations, this may improve accuracy or provide consistent results for materials which may relax over time when exposed to a clamping force. Providing dynamic clamping force that may increase/decrease to maintain a set force may secure a sample to prevent movement of the sample during testing which could cause inaccurate results.

In some embodiments, control software program 112 is configured to adjust the probe to detect the position of the sample surface. In some embodiments, control software program 112 advances the probe toward the sample to detect the position of the surface. Detection of the surface of the sample may occur when force measurement is recorded, e.g. by load cell 110. Once the surface is detected, the position of the probe is recorded to provide a basis for IM and RT calculations.

In some embodiments, control software program 112 is configured to adjust the preload depth a set distance into the sample surface or until a force limit is reached. Accurate measurement of the sample surface position and pre-load distance is important as a difference of a few microns can affect IM and RT measurements. In some situations, control software program 112 adjusts the preload depth for different objects/materials. Adjusting preload distance based on the sample material may provide more consistent and accurate IM and RT measurements as each material has surface properties that effect IM and RT testing. Preloading the sample may provide more accurate IM and RT values.

Database

The operating parameters and IM and/or RT data stored by PPT 10 may be compiled in a central database for further analysis. Measurements may be taken during the life cycle of a cable, or other device comprising polymeric material, to analyze deterioration and the remaining life left in the cable. Additional measurements may be taken at the time of IM and RT testing, such as radiation, humidity, and temperature.

Indenter Probe

Interchangeable probes having a variety of tip sizes can be used based on the type of polymer or elastomer sample (e.g., cable) tested. The programming options for driving the motion of the tip are very broad and easily adjusted. The input parameters that can be controlled and changed include the preload, the indentation depth, the indentation speed, the type of driving input signal (linear, sinusoidal, etc.), the force relaxation parameters, the deformation recovery parameters. Custom signal profiles can be developed quickly for the purpose of researching new test conditions to enhance the sensitivity to polymer degradation.

HMI Screen

An Human Machine Communication Interface Screen 104 may be provided to show the user information necessary to operate PPT 10 or to provide results of the measuring process. Lights 98, e.g. LED(s), for indicating tool status (e.g. a green and red light) may be provided in the HMI Screen, rocker switch, or other visible location to signal the user of a particular mode of operation.

Heater

PPT 10 may be provided with a heater 97 which may heat the sample, e.g. cable 100, after it is secured by clamp 92. As shown in FIG. 2B, heater 97 is a heater plate that is configured to heat a surface of the sample immediately surrounding probe 50. Heater 97 may be configured to heat the sample, e.g. a polymeric cable jacket of cable 100, to a test temperature as part of a control loop. The pre-heat process turns the heater on and off to reach and maintain the set point for the test temperature e.g. within +/−2° C. The set point temperature may be a pre-defined value that is consistent with previous measurement on the sample. A consistent temperature between test runs mitigates against temperature induced changes to the samples material properties that may impact IM and RT values. PPT may also perform multiple tests each at different temperatures to measure how the IM and/or RT varies with temperature.

In another embodiment, heater 97 may be configured to provide heat directly to the location where probe 50 indents the sample. Heat may be provided to the location where probe 50 indents the sample by a heating plate, laser, radiofrequency, infrared, or other suitable heat source. In an example, a heat is provided directly to the location where probe 50 will indent the sample by a laser transmitted through hole 96. The laser, or other direct heat source, may project heat along a vector that is at an angle with respect to a plane defined by hole 96 so as to not interfere with temperature measurement (discussed below).

Temperature Sensor

The PPT may include one or more temperature sensors.

PPT output parameters that help characterize the tested polymeric material can be significantly affected by temperature, even in the 15 to 30° C. temperature range. Therefore temperature in the tested area of the sample must be accurately monitored. A first temperature sensor may be used, which is, in most cases, a contactless sensor, such as an infrared subminiature thermocouple, that is positioned to measure the surface of the material to be tested just prior to performing an indentation. In other words, the first temperature probe measures the sample temperature. In an embodiment, a second temperature sensor, e.g. a resistance thermometer (RTD) may measure the temperature of heating plate and provide feed back to the heating plate temperature controller. The second temperature sensor may be located within heating plate 97. The temperature information from each temperature sensor is logged to provide a means of applying correction factors to the indentation data in order to compensate for fluctuations in temperature and when performing subsequent measurements to the same area at a later point in time. It can also provide a means for controlling a heating or cooling apparatus to allow for indentation measurements to be taken at constant reference temperatures. The incorporation of a temperature sensors can improve reliable measurement of the PPT indentation output data.

When direct heat is provided to a sample at the location where indention will occur, heat from the emitter, e.g. heating plate, laser, radio frequency emitter, or infrared emitter, may distort temperature measurement by a temperature sensor. In an example, the direct heat emitter and the temperature sensor may each emit and measure temperature respectively along different vectors to avoid interference that may lead to distorted measurements.

In a further example, another temperature sensor may be mounted on PPT 10 to measure the ambient air temperature.
Battery PPT 10 may be powered by a battery 99, e.g. a 24 V battery system. The battery may be rechargeable and be fitted with a quick connection system to allow fast battery changes in the field. The battery is recharged with a power supply connected to AC mains power. The battery pack is sized to provide sufficient runtime of the PPT so that operational efficiency is maintained. Battery replacement may be done at a convenient time e.g. shift change or during rest breaks such that.
Indentation Test Using the Portable Polymer Tester The present disclosure further provides a method for testing or monitoring polymer aging comprising the steps of:

(a) bringing an indenter probe tip into contact with the polymer, for example a polymer jacket of a cable (the "preload phase");

(b) advancing the indenter probe to deform the polymer while measuring force at the probe tip and displacement of the probe (the "indentation phase");

(c) stopping movement of the probe when a predetermined position is reached;

(d) measuring force exerted on probe tip at the maximum indentation to derive a stiffness or indenter modulus parameter;

(e) holding the probe at a predetermined maximum indentation position to allow polymer force relaxation for a predetermined time of, for example, about 60 s;

(f) retracting the probe quickly (at a speed of approximately 50 to 100 mm/s) to a predetermined intermediate position and monitoring the recovery time until contact with the probe reoccurs (the "recovery phase"); and (g) retracting the probe back to a position out of contact with the polymer jacket and removing the cable.

Figure 3B:
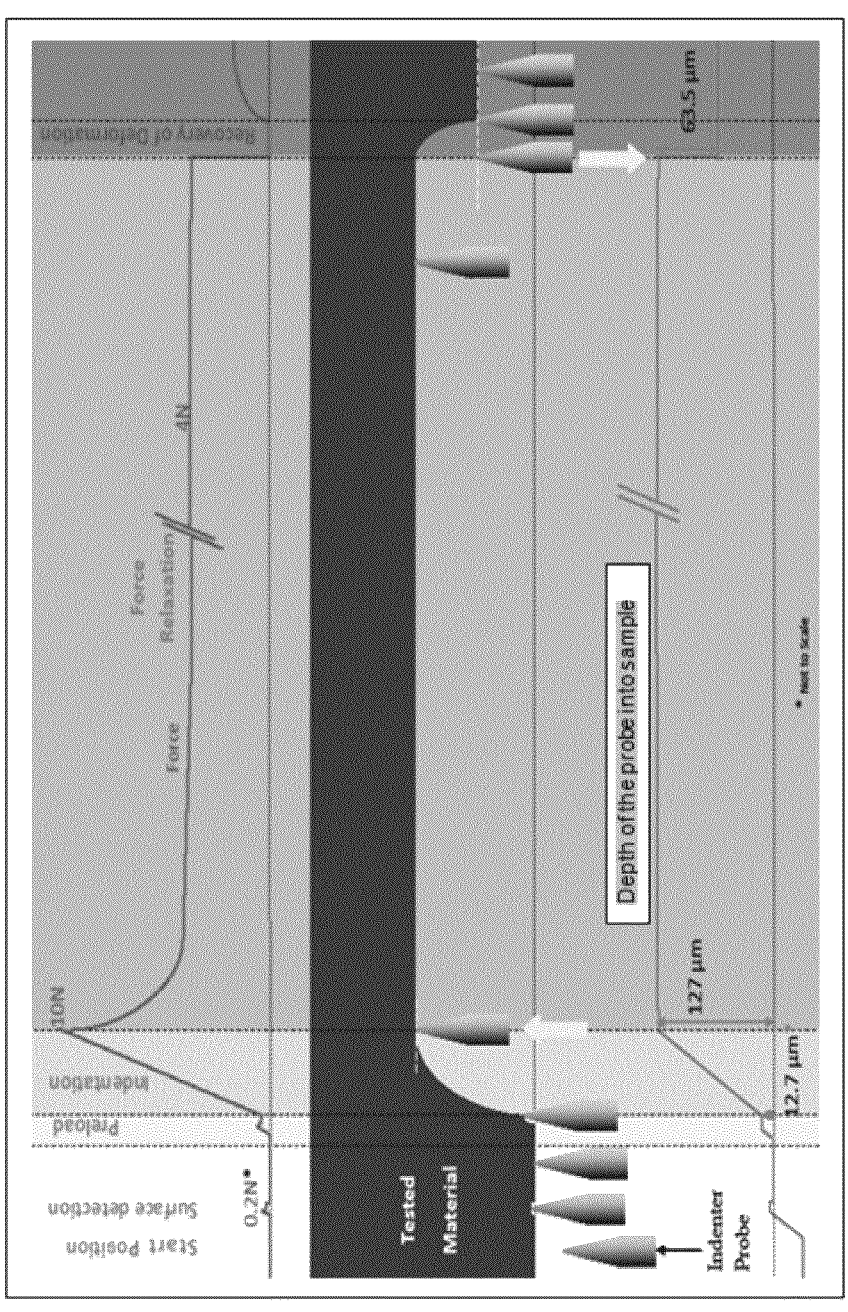

Steps (a) to (f) are illustrated in the schematic shown in FIG. 3B.

For polymer materials that are not too soft, the change in force during indentation is basically proportional to the change in displacement. In this case, the resulting specific compressive stiffness of the polymer is calculated directly using the force and displacement data, where the change in force is divided by the change in displacement.

Figure 5:
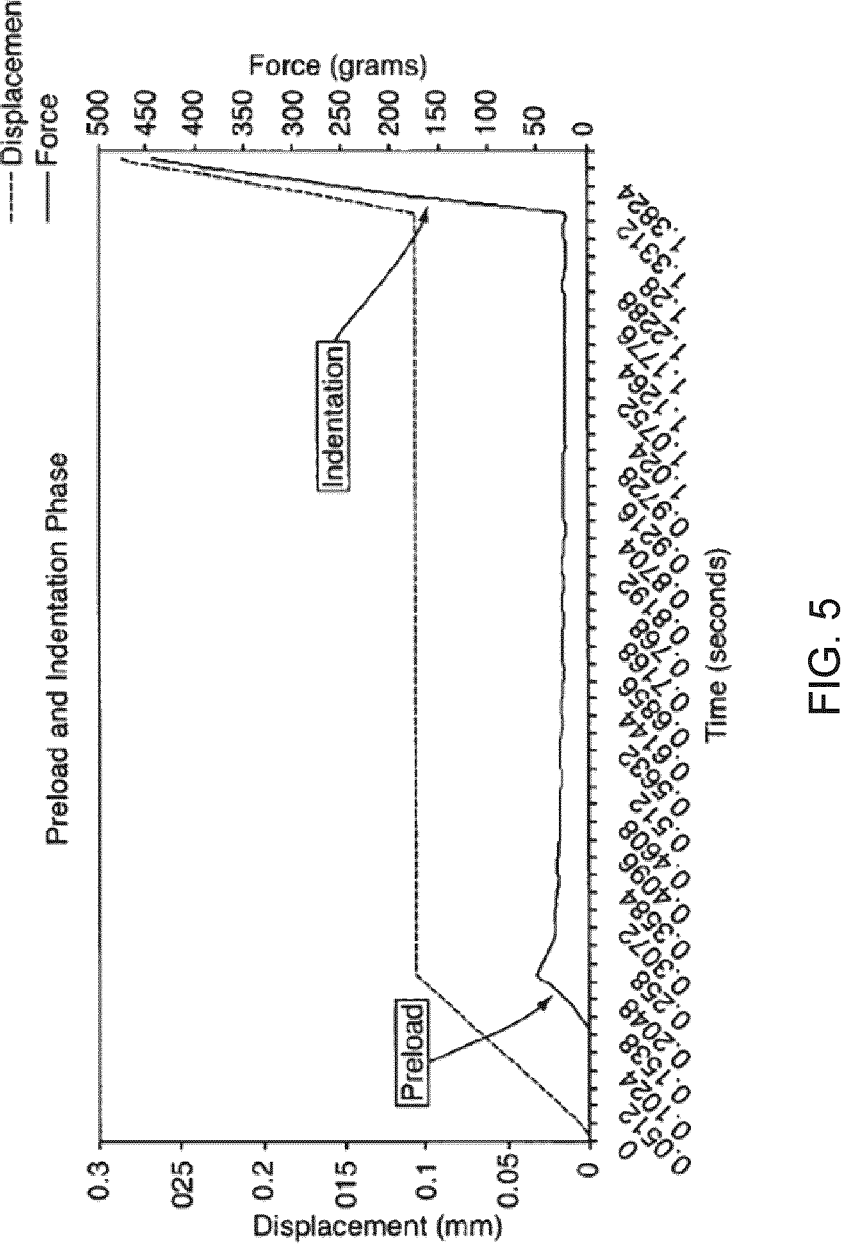
FIG. 5 graphically depicts an example preload and initial indentation phase of a test cycle.

As noted above, the indentation phase is preceded by a short small preload phase to move the probe a distance into the polymer surface. A graphical depiction of force and displacement changes that occur during this stage is provided in FIG. 5.

The PPT of the present disclosure was developed to perform the method of polymer testing set out above. The PPT offers the option of programming the indenter probe displacement profile and controlling the probe position to derive other post-indentation parameters such as the force relaxation (once the material has been indented), and the time to recover a set percentage of initial deformation (once the indenter is quickly retracted following the relaxation phase). The force relaxation level (and overall shape of the force relaxation curve) does not significantly change when comparing unaged and aged sample characteristics. However, this force relaxation phase will pre-condition the material to show a large difference between unaged and aged samples during the recovery phase.

Figure 6:
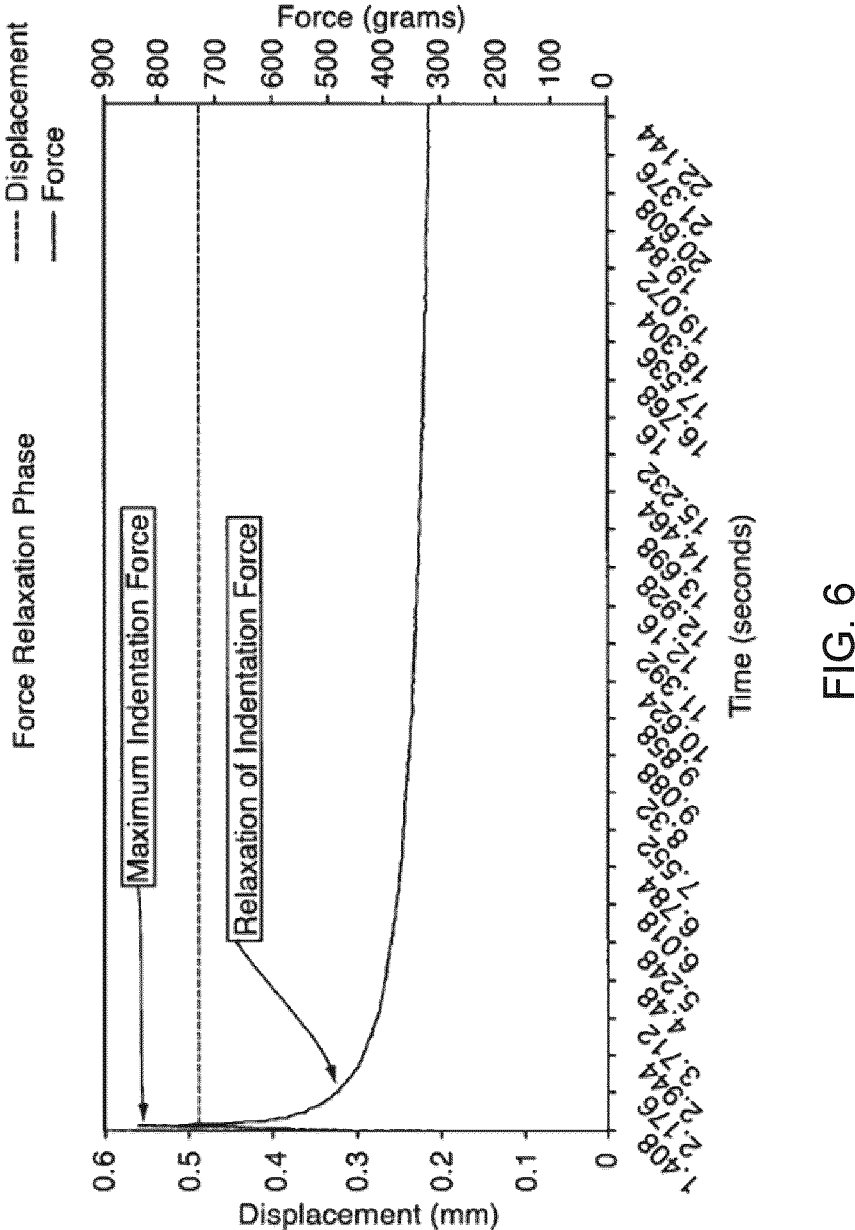
FIG. 6 graphically depicts a part of an example force relaxation phase of a test cycle.

A graphical depiction of force and displacement changes that occur during force relaxation phase is provided in FIG. 6.

Figure 7A:
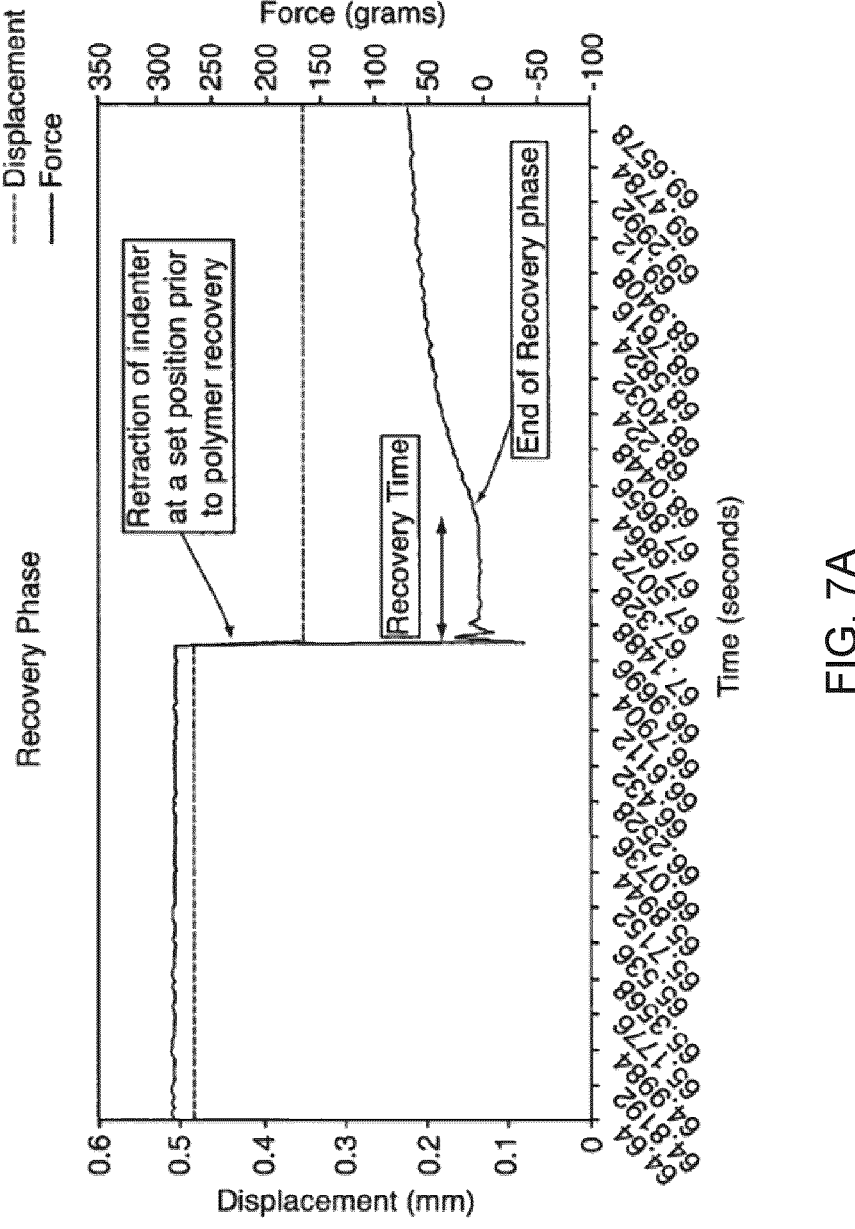
FIG. 7A graphically depicts an example recovery phase of a test cycle, FIG. 7B graphically depicts Indenter Modulus values of an example PVC Jacket, and FIG. 7C graphically depicts recovery time of the example PVC Jacket of FIG. 7B.
Figure 7B:
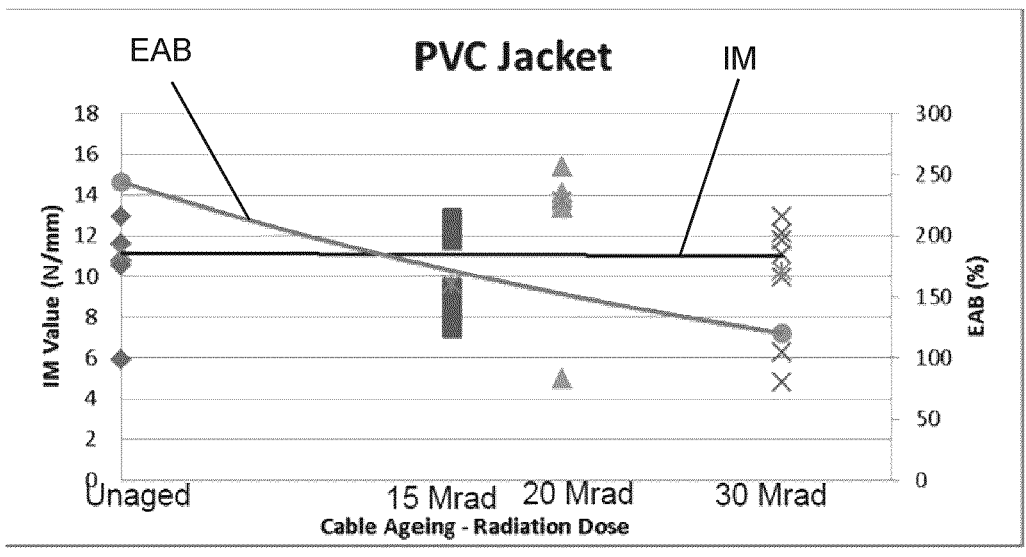
Figure 7C:
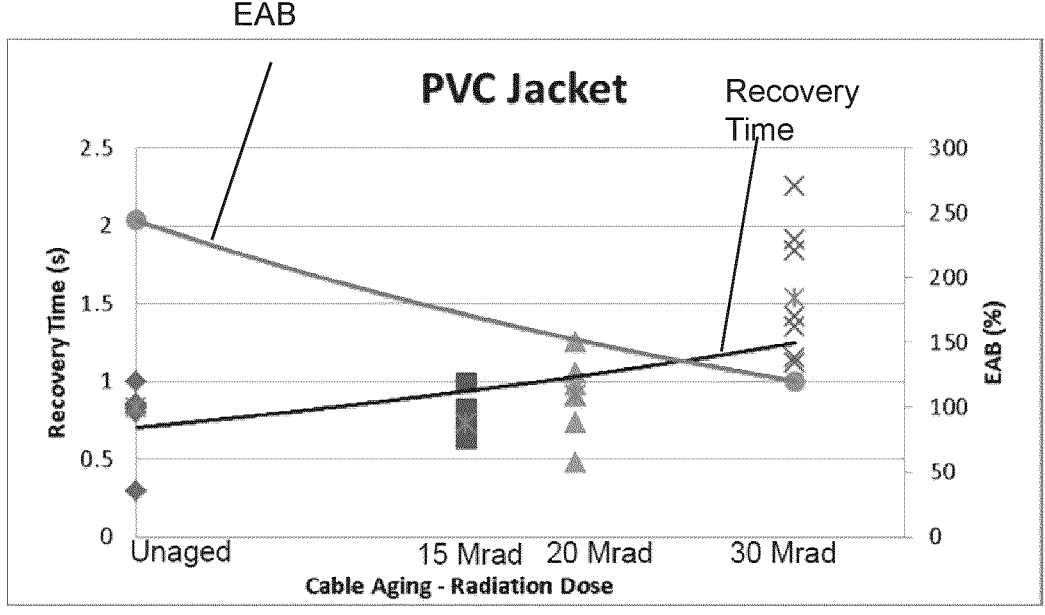

A graphical depiction of force and displacement changes that occur during the recovery phase is provided in FIG. 7A. During the recovery phase, the tip is retracted using the controller to a pre-defined position where it waits for the polymer surface to resume contact. This retraction is done quickly such that the probe tip comes briefly out of contact with the polymer to initiate recovery of deformation. The reference percentage of recovery set for the measurement is based on the sensitivity of the technique to material degradation. During this phase, the parameter of interest is the recovery time, or the time that it takes, from initial probe tip retraction, for the material surface to come into contact with the retracted probe tip. Generally, as a result of thermal aging and/or irradiation, the recovery time tends to significantly increase. Therefore, this parameter is very sensitive to polymer degradation resulting from this type of stressors. For certain materials, Indenter Modulus may not detect cable aging. As shown in FIG. 7B, exposure to radiation causes a decrease in EAB % of a PVC jacket; however, the IM value remains the same. FIG. 7C illustrates the recovery time for the same experiment shown in FIG. 7B. As shown in FIG. 7C, the recovery time measures a distinct increase, giving an indicating of material degradation.

The recovery time has now been shown to correlate very well with PVC degradation resulting from increasing irradiation level and increasing thermal aging, especially at percentages of recovery around 35 to 50%. The change in recovery time is similar to the change in tensile characteristics of the material resulting from the effect of irradiation.
Dynamic Oscillation Mode:

The PPT of the present disclosure can also be used to analyse polymer properties using a dynamic oscillation mode where the input probe displacement is controlled to generate a sinusoidal excitation. For softer materials, the probe remains in contact throughout the entire oscillation period. The simultaneous acquisition of the material reaction force and displacement for the indenter probe over one oscillation period permits further analysis and allows access to other parameters such as the specific dynamic stiffness and a parameter that characterizes the visco-elastic properties of the material (this parameter being derived from the measurement of lag (or phase) that exist between the force and displacement signals in visco-elastic materials).

Figure 8:
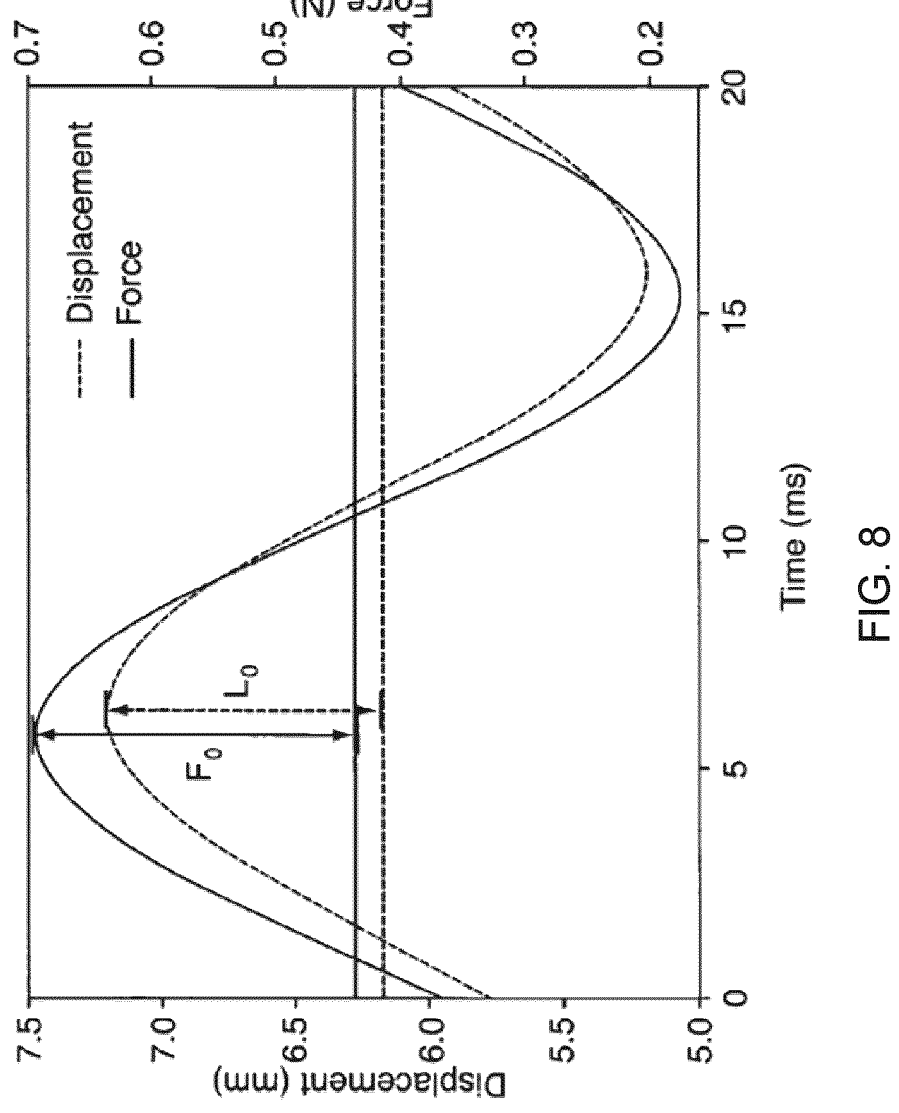
FIG. 8 graphically depicts an example indenter probe displacement and reaction force for one oscillation period obtained using a portable polymer tester according to the present disclosure in the oscillation mode.

When a sinusoidal displacement d is applied to a relatively soft polymeric material using the PPT, the material reaction force F on the indenter probe tip will lag behind the displacement as expressed in the following Equations:

$$d = d_0 \sin \omega t \tag{1}$$

$$F = F_0 \sin(\omega t + \delta) \tag{2}$$

Where t is the time, $F_0$ and $d_0$ are respectively the maximum reaction force and the maximum indentation depth reached during one sinusoidal cycle, $\omega$ is the angular velocity of the sinusoidal oscillations, and δ is the phase angle (amount that force lags behind displacement). Typical force and displacement time history curves are shown in FIG. 8.

For softer polymeric materials, dynamic stiffness parameters can be derived from the use of the PPT in the oscillatory mode. These parameters can be correlated to the degradation of the material tested. The complex dynamic stiffness k* for a visco-elastic material, as expressed in Equation (3), consists of a real component k' (which is in phase with the imposed sinusoidal displacement d) and an imaginary component k" (which is 90° out of phase with the imposed displacement d).

$$k^* = k' + ik'' \quad (3)$$

The dynamic stiffness parameters can be derived as follows:

Absolute dynamic stiffness:

$$|k^*| = \frac{F_0}{d_0} \quad (4)$$

Real component of dynamic stiffness: $k' = |k^*| \cos \delta$ (5)

Imaginary component of dynamic stiffness:
$k'' = |k^*| \sin \delta$ (6)

For the assessment of material degradation resulting from thermal aging and/or irradiation, a non-dimensional parameter D is defined as follows:

$$D = \frac{k'}{k''} = \frac{1}{\tan \delta} \quad (7)$$

Where D is a parameter characterizing the visco-elastic properties of the tested material. Changes in these properties as a result of thermal aging and/or irradiation usually results in an increase of this visco-elasticity parameter. Therefore, this parameter and the specific dynamic stiffnesses can be used to assess the degradation of softer polymeric materials.

Applications of Polymer Testing

The PPT and method of the present disclosure are useful in testing and/or monitoring polymer or elastomer properties, often as a measure of age or degradation of the polymer or elastomer. The following is a non-limiting list of polymer or elastomer containing components that can be analysed using the PPT and method of the present disclosure:

Cable insulations
Cable jackets
O-Rings
Drive Belts
Diaphragms
Gloves
Seals
Gaskets
Hoses
Flat reference slabs of materials for qualification work As described in more detail above, the sample retaining assembly of the PPT can be eliminated or adapted to facilitate analysis of different sample types. For example, the sample retaining assembly will have a different configuration for a tubular sample than a flat sample.

Furthermore, for softer elastomeric materials (seals, o-rings, some gasket materials, etc. . . . ), the oscillatory mode provides a better assessment of material degradation than the classical indenter testing. In oscillatory mode, the dynamic parameters and the degradation factor are used. If the classic indentation test were used in this case it would not be possible to derive a stiffness since there would likely be no linear relationship between force and displacement data measured at various reference times during the indentation. Also the softer elastomeric materials are very bouncy even when aged, therefore the recovery time would be very difficult to measure because it would be very short and recovery time changes would be more difficult to identify between unaged and aged samples.

For harder elastomeric and polymeric materials (cable insulation, cable jacket, hoses, some gaskets materials, some seals materials, etc), the classic indentation test would be used with the stiffness measurement based on simultaneous measurement of force and displacement and within the measurement of recovery time. The oscillatory mode could not be used in this case because the materials would generally not be "bouncy" enough to keep the indenter probe in contact at all times with the material when generating a forced oscillation motion.

The PPT and method of the present disclosure have broad application, for example, for Material Qualification (manufacturing), Life Extension & Monitoring Programs, Laboratory Materials Research, Preventative Maintenance, etc. As result, the PPT and method can be useful in various fields and industries, such as Energy, Aerospace, Materials Science, Automotive, Military, Chemical Process, all of which make use of polymeric and elastomeric material.

To gain a better understanding of the disclosure described herein, the following examples are set forth. It should be understood that these examples are for illustrative purposes only. Therefore, they should not limit the scope of this disclosure in any way.

EXAMPLES

Example 1: Indenter Testing of PVC Cable Jacket Thermally Aged Only

A series of PVC cable jacket samples were thermally aged at 110° C. in a ventilated oven for durations of up to 200 days. The aged samples were then tested using a PPT according to one embodiment of the present disclosure.

Figures 9, 10:
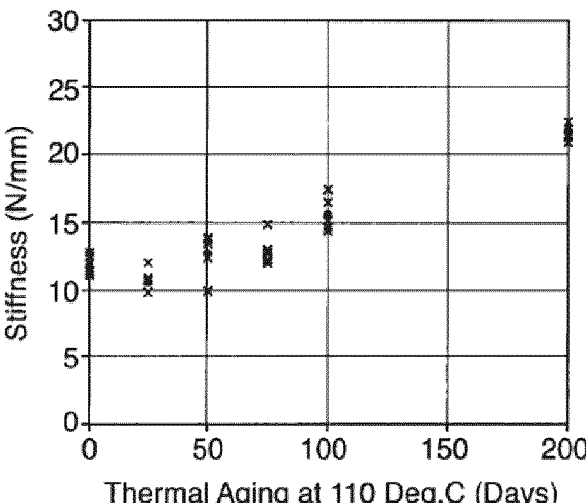
FIG. 9 graphically depicts stiffness results from indenter testing of thermally aged PVC cable jacket.
FIG. 10 graphically depicts recovery of deformation data from indenter testing of thermally aged PVC cable jacket.

The specific compressive stiffness results are shown in FIG. 9. There is a gradual change in stiffness as a function of the number of thermal aging days, from 11.9 N/mm for the unaged samples to 21.7 N/mm for samples thermally aged 200 days at 110° C. The time to recover 35% of the initial deformation is shown in FIG. 10. It can be seen that the recovery time is very sensitive to the effect of increased thermal aging duration, with a change of about +75% after 50 days, +167% after 75 days, +392% after 100 days, and +788% after 200 days.

Example 2: Indenter Testing of PVC Cable Jacket Irradiated Only

A series of PVC cable jacket samples were irradiated in a gamma cell at doses ranging from 2 to 60 MRad. The samples were then tested using a PPT according to one embodiment of the present disclosure and using a standard elongation-at-break method. The dumbbell-shape of PVC cable jacket specimen is placed in the pneumatic grips of a Lloyd LRSK tensile test machine and pulled until failure. The EAB parameter is defined as the percentage increase in elongation at the time of fracture.

21

Figures 11, 12:
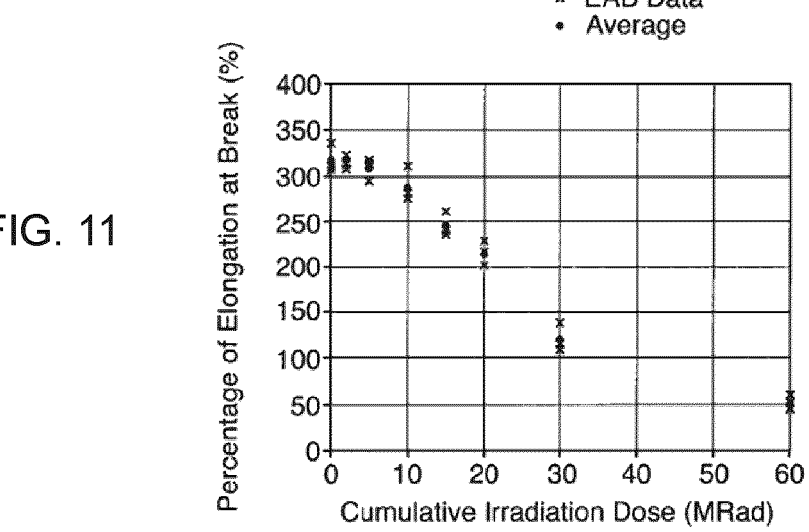
FIG. 11 graphically depicts elongation-at-break data for irradiated PVC cable.
FIG. 12 graphically depicts stiffness results from indenter testing of irradiated PVC cable jacket.

The reference elongation-at-break data for these irradiated PVC cable is shown as a function of irradiation dose in FIG. 11. The graph shows that at 60 MRad the elongation-at-break is down to 50% absolute, a level of degradation that corresponds to the commonly accepted end-of-life point for a cable [IAEA-TECDOC-1188, 2000 (above)].

The specific compressive stiffness results for irradiated PVC cable jacket samples are shown in FIG. 12. The stiffness parameter is not sensitive to the degradation resulting from irradiation. This confirms what was found in earlier studies reported in the literature [IAEA-TECDOC-1188, 2000 (above)].

Figure 13:
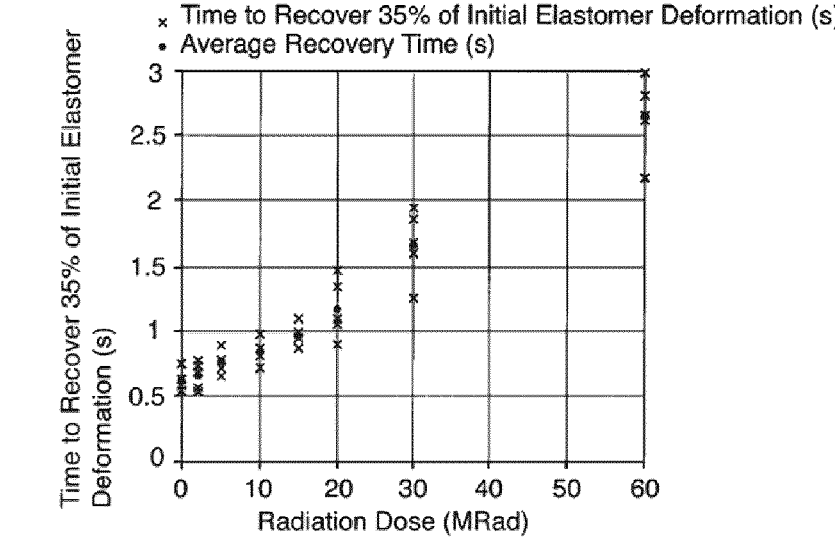
FIG. 13 graphically depicts recovery of deformation data from indenter testing of irradiated PVC cable jacket.
Figure 14:
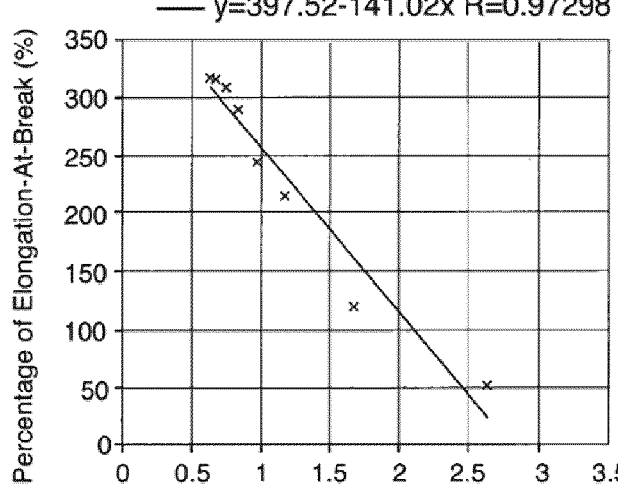
FIG. 14 shows the correlation between the elongation-at-break data from FIG. 11 and the recovery of deformation data from FIG. 13.
Figures 18A, 18B:
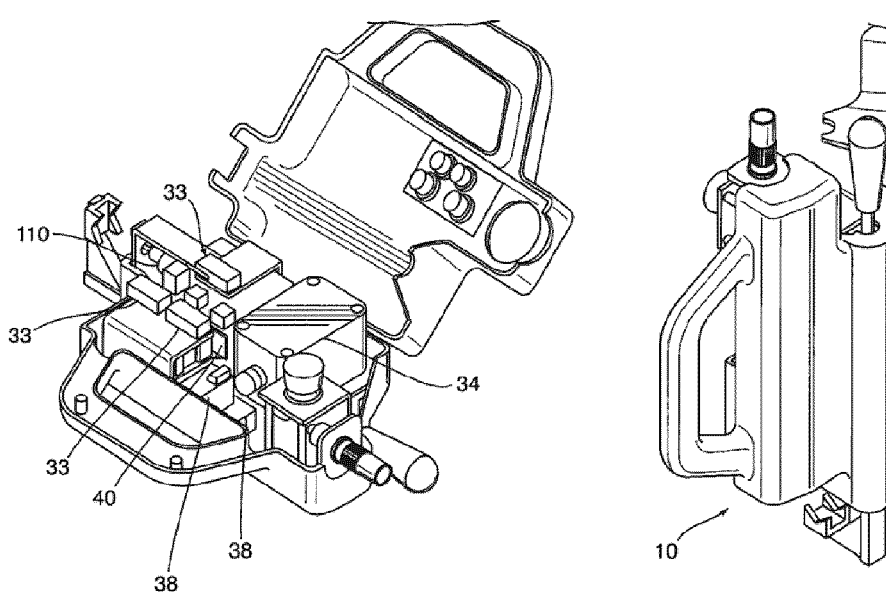
FIG. 18 shows drawings of a portable polymer tester according to one embodiment of the disclosure, in which the housing is open (18A shows a top perspective view and 18B shows bottom perspective view).

The recovery of deformation data for the same irradiated samples are shown in FIG. 13. The time to recover 35% of the initial deformation increases almost linearly as a function of irradiation dose. From the unaged condition, there is an increase in average recovery time of 33% at 10 MRad, 86% at 20 MRad, 165% at 30 MRad, and 320% at 60 MRad. Therefore, this new approach, utilizing recovery time, provides a means of assessing, for the first time, the degradation of irradiated PVC using an indentation method. Moreover, the deformation recovery time correlates very well with the EAB values measured for the various irradiation levels, with both parameters being extremely sensitive to the material degradation. The good correlation between the elongation-at-break and the time to recover 35% of the initial deformation is shown in FIG. 14.

Figure 19:
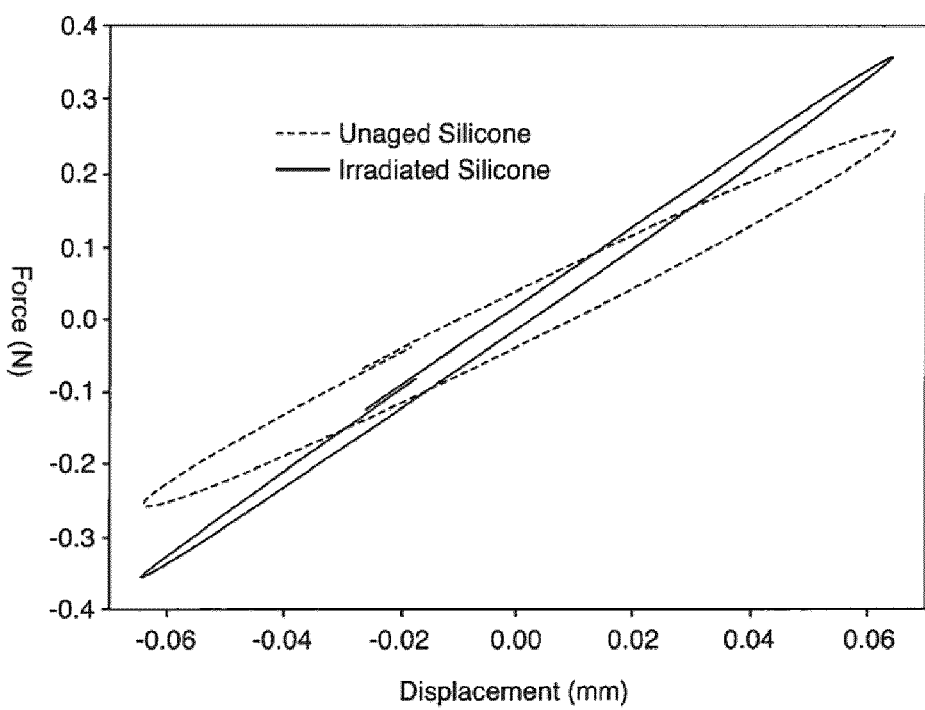
FIG. 19 graphically depicts a phase shift between force and displacement for a silicone door seal material (Lissajous diagram).

Example 3: Derivation of Dynamic Parameters Using the PPT in Oscillatory Mode for Unaged and Irradiated Silicone Samples The dynamic stiffness parameters and the visco-elasticity parameter D are compared in Table 1 for unaged and 60 Mrad irradiated samples of a silicone door seal material used in nuclear stations. As a result of irradiation, the real component of the dynamic stiffness k' increases from 4.88 to 7.81 N/mm. The imaginary component k" decreases from 0.89 to 0.45 N/mm. The visco-elasticity parameter D increases from 5.48 to 17.3. The force is shown as a function of displacement in FIG. 19 for the unaged and irradiated samples.

TABLE 1

Comparison of dynamic parameters derived using the PPT oscillatory mode for unaged and irradiated silicone samples

| Dynamic Parameters Derived for a 5 Hz Sinusoidal Motion | Unaged Silicone Sample | 70 Mrad Irradiated Silicone Sample |
|---|---|---|
| Real Component of Dynamic Stiffness: k' (N/mm) | 4.88 | 7.81 |
| Imaginary Component of Dynamic Stiffness: k" (N/mm) | 0.89 | 0.45 |
| Absolute Dynamic Stiffness k* (N/mm) | 4.96 | 7.82 |
| Visco-elasticity Parameter $D = \dfrac{k'}{k''}$ | 5.48 | 17.3 |

All publications, patents and patent applications mentioned in this Specification are indicative of the level of skill of those skilled in the art to which this disclosure pertains and are herein incorporated by reference to the same extent as if each individual publication, patent, or patent applications was specifically and individually indicated to be incorporated by reference.

The disclosure being thus described, it will be obvious that the same may be varied in many ways. Such variations are not to be regarded as a departure from the spirit and scope of the disclosure, and all such modifications as would be obvious to one skilled in the art are intended to be included within the scope of the following claims.

The invention claimed is:

1. A portable testing device for in-situ measuring physical characteristics of a cable or wire comprising polymeric or elastomeric material, said device comprising:

(a) an indenter probe;

(b) a drive system for controlling movement of said probe, said drive system comprising a motorized linear slide operatively associated with the probe to advance said probe from a first position to a second position to deform said polymeric or elastomeric material and to facilitate retraction of said probe to a predetermined intermediate position between said first and second positions;

(c) a force/displacement measurement system including a first sensor for measuring force at the tip of said probe during contact with said polymeric or elastomeric material and a second sensor for measuring displacement of the probe;

(d) a plate heater configured to directly heat a test location of the polymeric or elastomeric material to a set temperature, wherein the test location is located where the indenter probe indents the polymeric or elastomeric material, wherein the plate heater defines a hole through which the indenter probe is configured to advance between the first and second positions;

(e) a first temperature sensor configured to measure a temperature of the polymeric or elastomeric material at the test location;

(f) a sample retaining assembly including a clamp for immobilizing all or a portion of the material during in-situ measurement, and a clamp control module configured to receive clamp force data from a third sensor indicating the force between the clamp and the polymeric or elastomeric material, and to move the clamp to maintain a set force between the clamp and polymeric or elastomeric material, wherein the clamp comprises a moveable clamping jaw and a stationary clamping member, wherein the clamp is configured to secure the polymeric or elastomeric material between the moveable clamping jaw and the stationary clamping member, the stationary clamping member comprising the hole through which the indenter probe is configured to advance between the first and second positions; and (g) a controller configured to:

(i) provide control to the force/displacement measurement system, the drive system, the clamp, and the plate heater;

(ii) receive data from the first temperature sensor of the temperature of the polymeric or elastomeric material at the test location;

(iii) receive data from the third sensor indicating the force between the clamp and material; and (iv) send data to instruct the plate heater to heat the polymeric or elastomeric material at the test location to a desired temperature;

(v) in response to the data received from the third sensor, send data to instruct the clamp to maintain the set force between the clamp and said polymeric or elastomeric material;

(vi) send data to instruct the indenter probe to deform the test location of said polymeric or elastomeric material.

2. The portable testing device of claim 1, wherein the motorized linear slide is a piezo-electric motor, and a ball screw drive or linear actuator; or the motorized linear slide is a direct current servo drive and a ball screw drive.

3. The portable testing device of claim 1, wherein controller is configured to:

(b) calculate a specific compressive stiffness of the polymer material from measured displacement of the probe and measured force at the tip of said probe during deformation or at maximum indentation of said polymer material;

(c) hold said probe to a predetermined indentation depth to allow for force relaxation; and (d) retract said probe to a predetermined intermediate position out of contact with the deformed polymer material and measuring time of recovery of deformation until contact of said polymer material with said probe reoccurs;

wherein the specific compressive stiffness and the time of recovery of deformation are indicators of degree of polymer aging.

4. A method for testing a polymer material aging comprising the steps of:

(a) providing the portable testing device of claim 1;

(b) heating the test location with the heater to a set temperature;

(c) deforming the test location of the polymer material using a probe;

(d) calculating specific compressive stiffness of the polymer material from measured displacement of the probe and measured force at the tip of said probe during deformation or at maximum indentation of said polymer material;

(e) holding said probe to a predetermined indentation depth to allow for force relaxation; and (f) retracting said probe to a predetermined intermediate position out of contact with the deformed polymer material and measuring time of recovery of deformation until contact of said polymer material with said probe reoccurs;

wherein the specific compressive stiffness and the time of recovery of deformation are indicators of degree of polymer aging.

5. The method claim 4, wherein measuring time of recovery until contact of said polymer material with said probe reoccurs comprises identifying the time between retracting said probe and recording a force value above zero.

6. The method of claim 4, wherein calculating the specific compressive stiffness comprises measuring displacement of a linear encoder.

7. The method of claim 4, comprising securing the material with a clamp, and modifying the force between the clamp and the material to maintain a set force.

8. The method of claim 4, comprising detecting a surface of the polymer material by extending the probe into contact with the polymer material to identify a zero position, and a preload phase comprising preloading said probe a distance into said polymer material from the zero position, and an indentation phase comprising advancing said probe to deform said polymer material while measuring force at the tip of said probe during deformation.

9. The method of claim 4, comprising preloading a tester device of claim 1 with test parameters for the polymer material, the test parameters comprising at least one of indentation depth, temperature, clamping force, preload distance, and retraction depth.

10. A method of predicting remaining life of a polymer comprising:

(a) providing the portable testing device of claim 1;

(b) testing the polymer to determine an indenter modulus (IM) or recovery time (RT) value;

(c) comparing the IM or RT value with benchmark data of the polymer;

(d) calculating a predicated value of the remaining life of the polymer by correlating the indenter modulus or recovery time value with the benchmark data of the polymer to determine a rate of deterioration; and by calculating the predicated value of the remaining life using the rate of deterioration to an end of life value for indenter modulus or recovery time.

11. The method of claim 10, comprising updating the benchmark data with the IM or RT value.

12. The portable testing device of claim 1, comprising a linear encoder located on a non-deflecting part of the drive system for measuring the indenter probe position.

13. The portable testing device of claim 1, wherein the plate heater is the stationary clamping member.

14. The portable testing device of claim 1, wherein the first temperature sensor is a contactless infrared thermocouple positioned to measure the test location surface prior indentation by the probe.

15. The portable testing device of claim 1, wherein the controller is configured to receive a historical temperature value, send data to the plate heater to heat the test location to the historical temperature value; and send the data to the drive system to deform the polymeric or elastomeric material at the test location using the probe when the test location is at the historical temperature.

16. The portable testing device of claim 1, wherein the controller is configured to:

send data to the plate heater to heat the test location to a first temperature;

send data to the drive system to deform the polymeric or elastomeric material at the test location using the probe when the test location is at the first temperature;

receive data from the first and second sensors of the force at the tip of the probe and the displacement of the probe when the test location is at the first temperature;

send data to the plate heater to heat the test location to a second temperature;

send data to the drive system to deform the polymeric or elastomeric material at the test location using the probe when the temperature at the test location is at the second temperature; and receive data from the first and second sensors of the force at the tip of the probe and the displacement of the probe when the temperature at the test location is at the second temperature.

\* \* \* \* \*